US012570129B2

(12) United States Patent
Hoofard et al.

(10) Patent No.: US 12,570,129 B2
(45) Date of Patent: Mar. 10, 2026

(54) LOADING DOCK AUTOMATED TRAILER DOOR SYSTEMS

(71) Applicant: ASSA ABLOY Entrance Systems AB, Landskrona (SE)

(72) Inventors: Richard K. Hoofard, Dallas, TX (US); L. Blake Whitley, Arlington, TX (US); Daryl Day, Frisco, TX (US); Stephen Kosek, Fort Worth, TX (US); Elijah Holzapfel, Irving, TX (US)

(73) Assignee: ASSA ABLOY Entrance Systems AB, Landskrona (SE)

( * ) Notice: Subject to any disclaimer, the term of this patent is extended or adjusted under 35 U.S.C. 154(b) by 672 days.

(21) Appl. No.: 17/829,057

(22) Filed: May 31, 2022

(65) Prior Publication Data

US 2022/0388380 A1 Dec. 8, 2022

Related U.S. Application Data

(60) Provisional application No. 63/196,143, filed on Jun. 2, 2021.

(51) Int. Cl.
*B60J 5/10* (2006.01)
*E05D 13/00* (2006.01)
(Continued)

(52) U.S. Cl.
CPC .............. *B60J 5/108* (2013.01); *E05D 13/10* (2013.01); *E05D 15/28* (2013.01); *E05D 15/524* (2013.01)

(58) Field of Classification Search
CPC .......... B60J 5/108; E05D 13/10; E05D 15/28; E05D 15/524
See application file for complete search history.

(56) References Cited

U.S. PATENT DOCUMENTS

| | | | |
|---|---|---|---|
| 1,775,909 A | 9/1930 | Mikkelsen | |
| 2,362,981 A | 11/1944 | Philemon | |

(Continued)

FOREIGN PATENT DOCUMENTS

| | | | |
|---|---|---|---|
| AU | 2005100075 A4 | 4/2005 | |
| CA | 2963656 A1 | 11/2017 | |

(Continued)

OTHER PUBLICATIONS

Dock Lighting Goes Green with the FT Ultra LED Docklight:, APS Resource, News Release. 1 page.

(Continued)

*Primary Examiner* — Saul Rodriguez
*Assistant Examiner* — Ashley K Romano
(74) *Attorney, Agent, or Firm* — Perkins Coie LLP

(57) ABSTRACT

The present disclosure is directed generally to automated trailer door systems for use at vehicle loading docks. At least a portion of the trailer door system can be externally driven for opening and closing trailer doors at the loading dock. The automated trailer door system can include a counterbalance shaft that moves the trailer door between a closed position and an open position; and a drive unit having a torsion member operably coupled to the counterbalance shaft; and a drive member rotatably engaged with the torsion member, the drive member having an engagement portion accessible external to the trailer door. Rotation of the drive member via the engagement portion can rotate the torsion member to move the trailer door between the closed and open positions. A door winder can be coupled to a centering body and have a motor to rotate the drive member via the engagement portion.

25 Claims, 30 Drawing Sheets

(51) Int. Cl.

| | |
|---|---|
| *E05D 15/28* | (2006.01) |
| *E05D 15/52* | (2006.01) |
| *E05D 15/524* | (2006.01) |

(56) References Cited

U.S. PATENT DOCUMENTS

| | | | |
|---|---|---|---|
| 2,883,182 A | 4/1959 | William | |
| 2,887,865 A | 5/1959 | Moler | |
| 3,051,014 A | 8/1962 | Houk | |
| 3,439,728 A | 4/1969 | Martini | |
| 3,630,557 A | 12/1971 | Pierce et al. | |
| 3,635,277 A | 1/1972 | Bahnsen | |
| 3,813,119 A | 5/1974 | Panici | |
| 3,894,571 A | 7/1975 | Hinchliff | |
| 4,009,051 A | 2/1977 | Kazis et al. | |
| 4,010,571 A | 3/1977 | Mcguire et al. | |
| 4,147,073 A | 4/1979 | Mercier | |
| 4,286,911 A | 9/1981 | Benjamin | |
| 4,476,853 A | 10/1984 | Arbogast | |
| 4,590,118 A | 5/1986 | Yatabe et al. | |
| 4,625,456 A | 12/1986 | Lafontaine | |
| 4,626,983 A | 12/1986 | Harada et al. | |
| 4,661,758 A | 4/1987 | Whittaker | |
| 4,744,121 A | 5/1988 | Swessel et al. | |
| 4,821,456 A | 4/1989 | Nogaki | |
| 4,843,373 A | 6/1989 | Trickle et al. | |
| 4,860,813 A | 8/1989 | Ballyns et al. | |
| 4,878,529 A | 11/1989 | Hormann | |
| 4,936,731 A | 6/1990 | Noble | |
| 4,988,254 A | 1/1991 | Alexander | |
| 5,026,242 A | 6/1991 | Alexander | |
| 5,047,748 A | 9/1991 | Trickle | |
| 5,056,847 A | 10/1991 | Stillwell et al. | |
| 5,085,094 A | 2/1992 | Clawson et al. | |
| 5,168,262 A | 12/1992 | Okayama | |
| 5,168,267 A | 12/1992 | Trickle | |
| 5,181,401 A | 1/1993 | Hodan | |
| 5,196,965 A | 3/1993 | Lang et al. | |
| 5,277,240 A | 1/1994 | Epema et al. | |
| 5,323,098 A | 6/1994 | Hamaguchi et al. | |
| 5,403,142 A | 4/1995 | Stewart | |
| 5,495,102 A | 2/1996 | Fine | |
| 5,544,924 A | 8/1996 | Paster | |
| 5,565,843 A | 10/1996 | Meyvis | |
| 5,576,533 A | 11/1996 | Tantraporn | |
| 5,775,107 A | 7/1998 | Sparkman | |
| 5,831,540 A | 11/1998 | Sullivan et al. | |
| 5,886,863 A | 3/1999 | Nagasaki et al. | |
| 5,886,883 A | 3/1999 | Rai | |
| 5,898,585 A | 4/1999 | Sirichote et al. | |
| 5,915,446 A | 6/1999 | De | |
| 6,082,952 A | 7/2000 | Alexander | |
| 6,125,582 A | 10/2000 | Mondragon et al. | |
| 6,134,835 A | 10/2000 | Krupke et al. | |
| 6,179,036 B1 | 1/2001 | Harvey | |
| 6,276,744 B1 | 8/2001 | Huber et al. | |
| 6,367,259 B1 | 4/2002 | Timm | |
| 6,369,462 B1 | 4/2002 | Siri | |
| 6,390,245 B1 | 5/2002 | Metz | |
| 6,442,897 B1 | 9/2002 | Mullet | |
| 6,476,572 B2 | 11/2002 | Lounsbury | |
| 6,523,823 B1 | 2/2003 | Bakoledis | |
| 6,543,375 B1 | 4/2003 | Sargent et al. | |
| 6,663,527 B2 | 12/2003 | Phelan et al. | |
| 6,781,516 B2 | 8/2004 | Reynard et al. | |
| 6,787,259 B2 | 9/2004 | Colborn et al. | |
| 6,810,817 B1 | 11/2004 | James | |
| 6,812,849 B1 | 11/2004 | Ancel | |
| 6,917,298 B2 | 7/2005 | Romano et al. | |
| 6,972,226 B2 | 12/2005 | Deppe et al. | |
| 6,975,226 B2 | 12/2005 | Reynard et al. | |
| 7,032,720 B2 | 4/2006 | Jette et al. | |
| 7,045,764 B2 | 5/2006 | Beggs et al. | |
| 7,119,673 B2 | 10/2006 | Eager et al. | |
| 7,162,762 B1 | 1/2007 | Gleason | |
| 7,165,486 B2 | 1/2007 | Alexander et al. | |
| 7,230,819 B2 | 6/2007 | Muchow et al. | |
| 7,254,868 B2 | 8/2007 | Mullet et al. | |
| 7,256,703 B2 | 8/2007 | Duvernell et al. | |
| 7,264,092 B2 | 9/2007 | Jette | |
| 7,274,300 B2 | 9/2007 | Duvernell et al. | |
| 7,327,107 B2 | 2/2008 | Mullet et al. | |
| 7,333,016 B2 | 2/2008 | Ancel | |
| 7,380,375 B2 | 6/2008 | Maly | |
| 7,686,061 B2 | 3/2010 | Mullet et al. | |
| 7,730,981 B2 | 6/2010 | Mccabe et al. | |
| 7,750,890 B2 | 7/2010 | Fitzgibbon et al. | |
| 7,864,030 B2 | 1/2011 | Jette | |
| 7,956,718 B2 | 6/2011 | Murphy et al. | |
| 8,058,970 B2 | 11/2011 | Mullet et al. | |
| 8,065,770 B2 | 11/2011 | Proffitt et al. | |
| 8,112,949 B2 | 2/2012 | Eungard | |
| 8,181,401 B2 | 5/2012 | Eungard | |
| 8,286,757 B2 | 10/2012 | Nelson | |
| 8,307,589 B2 | 11/2012 | Eungard | |
| 8,307,956 B2 | 11/2012 | Andersen et al. | |
| 8,345,010 B2 | 1/2013 | Fitzgibbon et al. | |
| 8,364,334 B2 | 1/2013 | Au et al. | |
| 8,407,842 B2 | 4/2013 | Story et al. | |
| 8,410,895 B2 | 4/2013 | Murphy et al. | |
| 8,421,611 B1 | 4/2013 | Coshow et al. | |
| 8,490,669 B2 | 7/2013 | Fletcher et al. | |
| 8,497,761 B2 | 7/2013 | Mcneill et al. | |
| 8,510,888 B2 | 8/2013 | Eungard | |
| 8,528,622 B2 | 9/2013 | Ehrlich | |
| 8,547,234 B2 | 10/2013 | Maly et al. | |
| 8,590,087 B2 | 11/2013 | Swessel et al. | |
| 8,590,674 B2 | 11/2013 | Jette | |
| 8,775,710 B1 | 7/2014 | Miller et al. | |
| 8,893,764 B2 | 11/2014 | Mascari et al. | |
| 8,959,838 B1 | 2/2015 | Marinelli | |
| 8,976,006 B2 | 3/2015 | Krupke et al. | |
| 8,978,562 B2 | 3/2015 | Nagamine et al. | |
| 9,211,889 B1 | 12/2015 | Hoetzer et al. | |
| 9,230,419 B2 | 1/2016 | Beggs et al. | |
| 9,234,377 B2 * | 1/2016 | Schatz | E06B 3/44 |
| 9,274,522 B2 | 3/2016 | Boos et al. | |
| 9,283,935 B2 | 3/2016 | Fujioka | |
| 9,487,984 B2 | 11/2016 | Wachtell et al. | |
| 9,517,902 B2 | 12/2016 | Harrington | |
| 9,564,072 B2 | 2/2017 | Senfleben et al. | |
| 9,623,859 B2 | 4/2017 | Lavoie et al. | |
| 9,633,537 B2 | 4/2017 | Beggs et al. | |
| 9,656,691 B2 | 5/2017 | Heimberger et al. | |
| 9,751,702 B1 | 9/2017 | Hoofard et al. | |
| 9,771,225 B2 | 9/2017 | Stone et al. | |
| 9,776,511 B2 | 10/2017 | Brooks et al. | |
| 9,777,529 B2 | 10/2017 | Mcneill et al. | |
| 9,926,148 B2 | 3/2018 | Hochstein et al. | |
| 9,957,121 B2 | 5/2018 | Sveum et al. | |
| 10,032,380 B2 | 7/2018 | Mushynski et al. | |
| 10,053,904 B2 | 8/2018 | Mcneill et al. | |
| 10,081,504 B2 | 9/2018 | Walford et al. | |
| 10,096,187 B2 | 10/2018 | Deneen et al. | |
| 10,106,342 B2 | 10/2018 | Avalos | |
| 10,227,190 B2 | 3/2019 | Brooks et al. | |
| 10,332,058 B1 | 6/2019 | Kandregula et al. | |
| 10,358,858 B2 | 7/2019 | Lietz et al. | |
| 10,435,936 B2 | 10/2019 | Lietz et al. | |
| 10,494,205 B1 | 12/2019 | Hoofard et al. | |
| 10,829,970 B2 * | 11/2020 | Ehrlich | E05D 13/1261 |
| 10,878,386 B2 | 12/2020 | Hoofard et al. | |
| 10,947,069 B2 | 3/2021 | Brooks et al. | |
| 11,124,372 B2 | 9/2021 | Hoofard et al. | |
| 11,142,413 B2 | 10/2021 | Hoofard et al. | |
| 11,225,402 B1 * | 1/2022 | Stokes | B66F 7/26 |
| 11,225,824 B2 | 1/2022 | Hoofard et al. | |
| 11,256,264 B2 | 2/2022 | Hoofard et al. | |
| 11,262,747 B2 | 3/2022 | Hoofard et al. | |
| 11,305,953 B2 | 4/2022 | Hoofard et al. | |
| 11,358,813 B2 | 6/2022 | Walford et al. | |
| 11,392,141 B2 * | 7/2022 | Dinh | B62D 15/0285 |
| 11,507,926 B2 | 11/2022 | Hoofard et al. | |
| 11,834,014 B2 * | 12/2023 | Yu | B60T 17/22 |

(56) References Cited

U.S. PATENT DOCUMENTS

| | | | |
|---|---|---|---|
| 11,919,343 | B2* | 3/2024 | McKibben et al. ........................ B60L 15/2009 |
| 2001/0035667 | A1 | 11/2001 | Gaeta |
| 2002/0089427 | A1 | 7/2002 | Aratani et al. |
| 2002/0130065 | A1 | 9/2002 | Bloom |
| 2003/0167238 | A1 | 9/2003 | Zeif et al. |
| 2004/0146384 | A1 | 7/2004 | Whelan |
| 2004/0182619 | A1 | 9/2004 | Mcgregor et al. |
| 2005/0050438 | A1 | 3/2005 | Cheung et al. |
| 2005/0102041 | A1 | 5/2005 | Duvernell et al. |
| 2005/0102042 | A1 | 5/2005 | Reynard et al. |
| 2005/0126081 | A1 | 6/2005 | Patel et al. |
| 2005/0262549 | A1 | 11/2005 | Ritt et al. |
| 2006/0119132 | A1 | 6/2006 | Rivers et al. |
| 2006/0137261 | A1 | 6/2006 | Maly |
| 2006/0145853 | A1 | 7/2006 | Richards et al. |
| 2006/0158752 | A1 | 7/2006 | Perkes |
| 2006/0181391 | A1 | 8/2006 | Mcneill et al. |
| 2006/0235737 | A1 | 10/2006 | Fleurant et al. |
| 2006/0289128 | A1 | 12/2006 | Ressel et al. |
| 2007/0062422 | A1 | 3/2007 | Wotring |
| 2007/0157614 | A1 | 7/2007 | Goldman |
| 2007/0256797 | A1 | 11/2007 | Orton et al. |
| 2007/0258798 | A1 | 11/2007 | Foster et al. |
| 2007/0283806 | A1 | 12/2007 | Morrison |
| 2008/0011799 | A1 | 1/2008 | Chang |
| 2008/0018438 | A1 | 1/2008 | Ehrlich et al. |
| 2008/0022596 | A1 | 1/2008 | Boerger et al. |
| 2008/0124203 | A1 | 5/2008 | Mcdonald |
| 2008/0127435 | A1 | 6/2008 | Maly et al. |
| 2008/0143290 | A1 | 6/2008 | Chavakula |
| 2009/0013497 | A1 | 1/2009 | Squyres et al. |
| 2009/0024979 | A1 | 1/2009 | Chessell et al. |
| 2010/0073197 | A1 | 3/2010 | Eagleton et al. |
| 2010/0146719 | A1 | 6/2010 | Swessel et al. |
| 2010/0289623 | A1 | 11/2010 | Roesner |
| 2011/0075441 | A1 | 3/2011 | Swessel et al. |
| 2011/0203059 | A1 | 8/2011 | Whitley et al. |
| 2011/0313893 | A1 | 12/2011 | Weik |
| 2012/0025964 | A1 | 2/2012 | Beggs et al. |
| 2012/0125545 | A1 | 5/2012 | Ehrlich |
| 2012/0304558 | A1 | 12/2012 | Iglesias et al. |
| 2013/0024334 | A1 | 1/2013 | Kozlay |
| 2013/0038731 | A1 | 2/2013 | Brey et al. |
| 2013/0059603 | A1 | 3/2013 | Guenec et al. |
| 2013/0117078 | A1 | 5/2013 | Weik et al. |
| 2013/0134938 | A1 | 5/2013 | Bianco |
| 2013/0188050 | A1 | 7/2013 | Winget |
| 2013/0261958 | A1 | 10/2013 | Herron |
| 2013/0312205 | A1 | 11/2013 | Riviere et al. |
| 2013/0327914 | A1 | 12/2013 | Mcneill et al. |
| 2013/0332217 | A1 | 12/2013 | Mcneill et al. |
| 2014/0070767 | A1 | 3/2014 | Morris et al. |
| 2014/0075842 | A1 | 3/2014 | Mcneill et al. |
| 2014/0137447 | A1 | 5/2014 | Mama |
| 2014/0222971 | A1 | 8/2014 | Cooper et al. |
| 2014/0225509 | A1 | 8/2014 | Wiegel et al. |
| 2014/0247347 | A1 | 9/2014 | Mcneill et al. |
| 2014/0251556 | A1 | 9/2014 | Orton |
| 2015/0009046 | A1 | 1/2015 | Senfleben et al. |
| 2015/0013083 | A1 | 1/2015 | Palmersheim |
| 2015/0039552 | A1 | 2/2015 | Moyne |
| 2015/0047132 | A1 | 2/2015 | Sveum et al. |
| 2015/0047133 | A1 | 2/2015 | Sveum |
| 2015/0294166 | A1 | 10/2015 | Kuehnle et al. |
| 2015/0308175 | A1 | 10/2015 | Wachtell et al. |
| 2016/0031482 | A1 | 2/2016 | Lavoie |
| 2016/0075526 | A1 | 3/2016 | Avalos |
| 2016/0090072 | A1 | 3/2016 | Eppley et al. |
| 2016/0104364 | A1 | 4/2016 | Brooks et al. |
| 2016/0178382 | A1 | 6/2016 | Penna et al. |
| 2016/0288833 | A1 | 10/2016 | Heimberger et al. |
| 2016/0362135 | A1 | 12/2016 | Xu et al. |
| 2016/0368489 | A1 | 12/2016 | Aich et al. |
| 2016/0369619 | A1 | 12/2016 | Parmeshwar et al. |
| 2017/0008498 | A1 | 1/2017 | Garrow et al. |
| 2017/0017392 | A1 | 1/2017 | Castaneda et al. |
| 2017/0043967 | A1 | 2/2017 | Walford et al. |
| 2017/0044817 | A1 | 2/2017 | Mcneill et al. |
| 2017/0073005 | A1 | 3/2017 | Jawad et al. |
| 2017/0106794 | A1 | 4/2017 | Constantine |
| 2017/0120734 | A1 | 5/2017 | Westerdale |
| 2017/0168501 | A1 | 6/2017 | Aoki et al. |
| 2017/0174209 | A1 | 6/2017 | Lavoie |
| 2017/0205824 | A1 | 7/2017 | Nordbruch et al. |
| 2017/0213404 | A1 | 7/2017 | Sivalingam et al. |
| 2017/0320685 | A1 | 11/2017 | Hoofard et al. |
| 2018/0035606 | A1 | 2/2018 | Burdoucci |
| 2018/0278897 | A1 | 9/2018 | Seaman et al. |
| 2018/0346029 | A1 | 12/2018 | Kabos et al. |
| 2019/0002216 | A1 | 1/2019 | Walford et al. |
| 2019/0039425 | A1 | 2/2019 | Dodd et al. |
| 2019/0056736 | A1 | 2/2019 | Wood et al. |
| 2019/0064835 | A1 | 2/2019 | Hoofard et al. |
| 2019/0144218 | A1 | 5/2019 | Hoofard et al. |
| 2019/0187716 | A1 | 6/2019 | Cantrell et al. |
| 2019/0197318 | A1 | 6/2019 | Krishnamurthy et al. |
| 2019/0202646 | A1 | 7/2019 | Brooks et al. |
| 2019/0226239 | A1 | 7/2019 | Trentham et al. |
| 2019/0301224 | A1 | 10/2019 | Barton |
| 2019/0302764 | A1 | 10/2019 | Smith et al. |
| 2019/0316403 | A1 | 10/2019 | Aiello |
| 2019/0392402 | A1 | 12/2019 | Vandergon et al. |
| 2020/0002993 | A1 | 1/2020 | Thouin |
| 2020/0018110 | A1 | 1/2020 | Lindley et al. |
| 2020/0087970 | A1 | 3/2020 | Nielson et al. |
| 2020/0115948 | A1 | 4/2020 | Lietz et al. |
| 2020/0125074 | A1 | 4/2020 | Ramos et al. |
| 2020/0133259 | A1 | 4/2020 | Van Wiemeersch et al. |
| 2020/0180881 | A1 | 6/2020 | Hoofard et al. |
| 2020/0239242 | A1 | 7/2020 | Hoofard et al. |
| 2020/0273133 | A1 | 8/2020 | Morris |
| 2020/0334631 | A1 | 10/2020 | Conlon |
| 2020/0361326 | A1 | 11/2020 | Krucinski et al. |
| 2020/0393828 | A1 | 12/2020 | Hoofard et al. |
| 2021/0079710 | A1 | 3/2021 | Evans et al. |
| 2021/0082220 | A1 | 3/2021 | Boerger et al. |
| 2021/0238908 | A1 | 8/2021 | Ramage et al. |
| 2022/0146269 | A1 | 5/2022 | Hoofard et al. |
| 2022/0243524 | A1 | 8/2022 | Hoofard et al. |
| 2022/0306410 | A1 | 9/2022 | Hoofard et al. |
| 2022/0338719 | A1 | 10/2022 | Walford et al. |
| 2022/0349715 | A1 | 11/2022 | Park |
| 2023/0003074 | A1 | 1/2023 | Hoofard et al. |
| 2024/0051521 | A1 | 2/2024 | James et al. |

FOREIGN PATENT DOCUMENTS

| | | |
|---|---|---|
| CA | 3067610 A1 | 7/2020 |
| CN | 2075169 U | 4/1991 |
| CN | 101716959 A | 6/2010 |
| CN | 103485613 B | 6/2015 |
| DE | 19836432 A1 | 3/1999 |
| DE | 202005008059 U1 | 11/2005 |
| DE | 102004037933 B3 | 2/2006 |
| DE | 202004016760 U1 | 3/2006 |
| DE | 102006014153 A1 | 10/2007 |
| DE | 202013008638 U1 | 11/2013 |
| EP | 0729856 A1 | 9/1996 |
| EP | 2215612 B1 | 8/2012 |
| EP | 2660170 A1 | 11/2013 |
| EP | 2692561 A1 | 2/2014 |
| FR | 933292 A | 4/1948 |
| FR | 2797246 A1 | 2/2001 |
| FR | 2869470 A1 | 10/2005 |
| GB | 1527046 A | 10/1978 |
| NL | 8902808 A | 6/1991 |
| WO | 2005045169 A1 | 5/2005 |
| WO | 2006066013 A2 | 6/2006 |
| WO | 2006076538 A2 | 7/2006 |
| WO | 2008014026 A1 | 1/2008 |
| WO | 2008014206 A1 | 1/2008 |
| WO | 2008036087 A1 | 3/2008 |
| WO | 2009070509 A1 | 6/2009 |

US 12,570,129 B2

Page 4

(56) References Cited

FOREIGN PATENT DOCUMENTS

| WO | 2010077977 A1 | 7/2010 |
|---|---|---|
| WO | 2011037839 A1 | 3/2011 |
| WO | 2015023666 A1 | 2/2015 |
| WO | 2015023669 A1 | 2/2015 |
| WO | 2015084167 A1 | 6/2015 |
| WO | 2015166339 A1 | 11/2015 |
| WO | 2016007321 | 1/2016 |
| WO | 2016209141 A1 | 12/2016 |
| WO | 2017100716 A1 | 6/2017 |
| WO | 2019090199 A1 | 5/2019 |
| WO | 2019173811 A2 | 9/2019 |
| WO | 2019209773 A1 | 10/2019 |
| WO | 2020156936 A1 | 8/2020 |

OTHER PUBLICATIONS

Pentalift introduces industry's first solar powered dock leveler! www.pentalift.com, Jun. 14, 2011, 1 page.
APS&GO—LED Communication System Specification Sheet, APS Resource, For APS1102, Nov. 2009, 2 pages.
Bin et al., Constrained Model Predictive Control for Backing-up Tractor-Trailer System, Proceeding of the 10th World Congress on Intelligent Control and Automation, Jul. 6-8, 2012, Beijing, China, pp. 2165-2170.
Desantis et al., Path-Tracking for Tractor-Trailers with Hitching of Both the On-Axle and the Off-Axle Kind, Proceedings of the 2002 IEEE International Symposium on Intelligent Control, 2002.
Energy Saving Products Brochure, APS Resource, Mar. 2009, 4 pages.
FT Ultra LED Flex Arm Docklight Specification Sheet, APS Resource, Form APS 1168, Nov. 2009, 2 pages.

Fuchs C et al: "3D pose estimation for articulated vehicles using Kalman-filter based tracking", Pattern Ricognition. Image Analysis, Allen Press, Lawrence, KS, US, vol. 26, No. 1, Jul. 23, 2016 (Jul. 23, 2016), pp. 109-113.
High Impact LED Dock Light Specification Sheet, APS Resource, Form APS1171, Nov. 2009, 2 pages.
Kelley Company; Vehicle Restraints brochure; 2008 ; 8 pages.
Manual and Automatic Light Communication Systems, User's Manual, Serco, Oct. 2009, 28 pages.
Mcgovern et al., An Articulated Truck on a Spreadsheet, Level 3, Issue 1, Nov. 2003, 23 pages.
Model G307K2 Kadet 2 Operator Interface with 7" TFT Display, Red Lion Controls, Inc., Nov. 23, 2015, 4 pages.
Oreh et al., A New Method for Directional Control of a Tractor Semi-Trailer, Australian Journal of Basic and Applied Sciences, 6(12): 369-409, 2012.
Rite-Hite Corporation, Rite-Vu Light Communication Systems Brochure, 6 pages [Not dated].
Safety & Lighting Products Brochure, APS Resource, Sep. 2004, 2 pages.
Serco Vehicle Restraints brochure; 2008; 4 pages.
Serco; Loading Dock Solutions brochure; 2008; 8 pages.
Smart Power Systems International GmbH, Web pages for Hybrid DC/AC Power Supply, Jun. 1, 2004.
Tofael Ahamed: "Navigation of an Autonomous Tractor Using Multiple Sensors", Thesis, Feb. 22, 2008 (Feb. 22, 2008), XP055527539, retrieved from the Internet: URL: https ://tsukuba.repo.nii.ac.jp, [retrieved ôn Nov. 27, 2018], Chapter 9.
Hamid et al. "Implementation of Intelligent Automated Gate System with QR Code," International Journal of Advanced Computer Science and Applications 9. Oct. 2018 (Year: 2018); 6 pages.
International Search Report and Written Opinion for PCT/EP2022/065012, mailed Jan. 2, 2023, 20 pages.

* cited by examiner

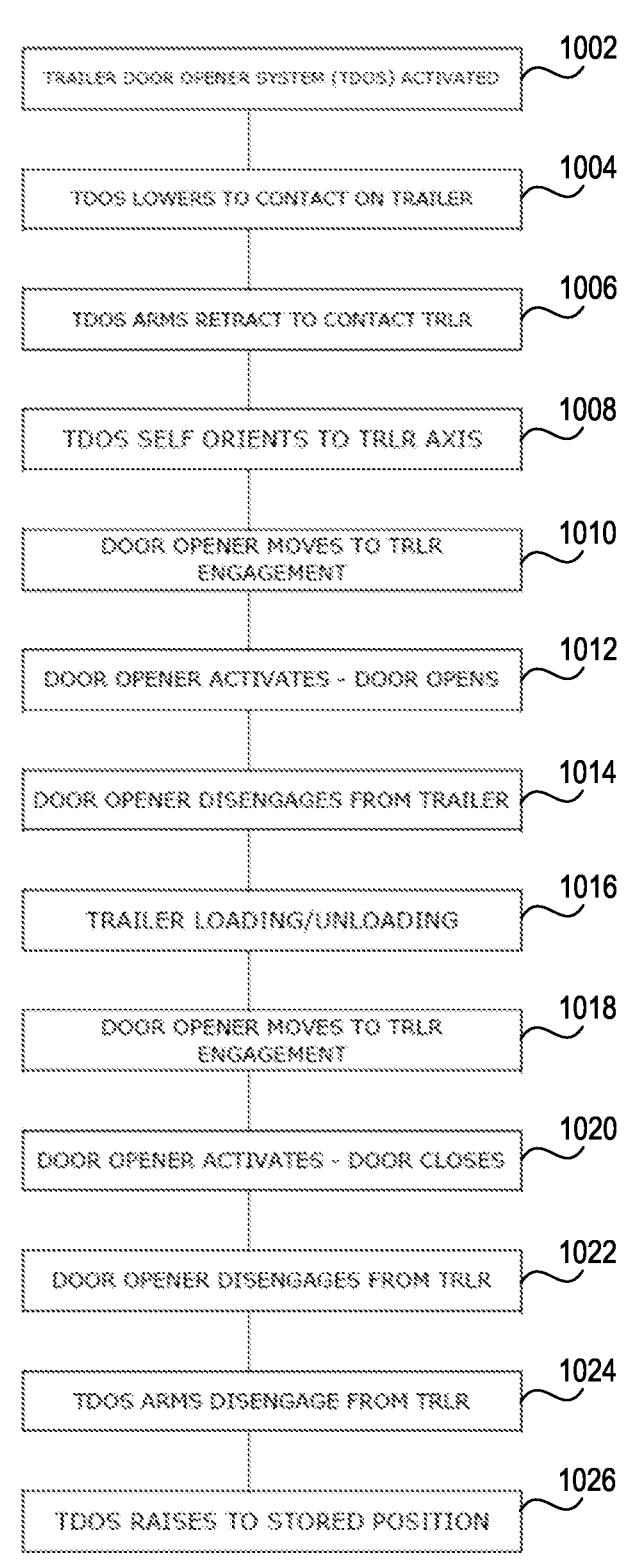

1000

1002 — TRAILER DOOR OPENER SYSTEM (TDOS) ACTIVATED

1004 — TDOS LOWERS TO CONTACT ON TRAILER

1006 — TDOS ARMS RETRACT TO CONTACT TRLR

1008 — TDOS SELF ORIENTS TO TRLR AXIS

1010 — DOOR OPENER MOVES TO TRLR ENGAGEMENT

1012 — DOOR OPENER ACTIVATES - DOOR OPENS

1014 — DOOR OPENER DISENGAGES FROM TRAILER

1016 — TRAILER LOADING/UNLOADING

1018 — DOOR OPENER MOVES TO TRLR ENGAGEMENT

1020 — DOOR OPENER ACTIVATES - DOOR CLOSES

1022 — DOOR OPENER DISENGAGES FROM TRLR

1024 — TDOS ARMS DISENGAGE FROM TRLR

1026 — TDOS RAISES TO STORED POSITION

1102 TRUCK PRESENCE SENSOR ACTIVATED

1104 RESTRAIN TRAILER* IF RESTRAINT PRESENT

1106 CALL AGV/FORKLIFT

1108 AGV/FORKLIFT OPEN DOOR

1110 AGV/FORKLIFT COMMUNICATE DOOR STATUS TO DOCK

1112 AUTOMATED DOCK PROCESS

1114 AGV/FORKLIFT CLOSE DOOR

1116 VERIFY TRAILER DOOR CLOSED

1118 TRAILER DEPARTS

LOADING DOCK AUTOMATED TRAILER DOOR SYSTEMS

CROSS-REFERENCE TO RELATED APPLICATION

This application claims priority to (i) Swedish Patent Application No. 2130327-6, filed Nov. 23, 2021, and titled "LOADING DOCK AUTOMATED TRAILER DOOR SYSTEMS"; (ii) Swedish Patent Application No. 2130326-8, filed Nov. 23, 2021, and titled "LOADING DOCK AUTOMATED TRAILER DOOR SYSTEMS"; (iii) Swedish Patent Application No. 2130325-0, filed Nov. 23, 2021, and titled "LOADING DOCK AUTOMATED TRAILER DOOR SYSTEMS"; (iv) Swedish Patent Application No. 2130324-3, filed Nov. 23, 2021, and titled "LOADING DOCK AUTOMATED TRAILER DOOR SYSTEMS"; (v) Swedish Patent Application No. 2130323-5, filed Nov. 23, 2021, and titled "LOADING DOCK AUTOMATED TRAILER DOOR SYSTEMS", all of which claim priority to U.S. Provisional Patent Application No. 63/196,143, filed Jun. 2, 2021, and titled "LOADING DOCK AUTOMATED TRAILER DOOR SYSTEMS, which is hereby incorporated by reference in its entirety.

TECHNICAL FIELD

The present disclosure is directed generally to automated trailer door systems at a vehicle loading dock and, more particularly, to externally driven systems for opening and closing trailer doors at a loading dock.

BACKGROUND

Vehicle docking facilities, such as warehouses, typically include multiple vehicle docking stations that facilitate the movement of goods between the facility and a vehicle parked at the docking station. Each vehicle docking station can include docking equipment used to improve the safety and efficiency of moving goods between the facility and the vehicle. A vehicle docking station can include, for example, a vehicle restraint used to ensure that the vehicle does not move away from the docking station during loading and unloading, a dock door used to control access into and out of the warehouse, a dock leveler used to provide a bridge or ramp between the vehicle and the facility, a barrier gate to prevent cargo or personnel from falling out of the docking station when the dock door is open, and/or an inflatable shelter to provide cover between the vehicle and the facility during loading and unloading. Trailer doors are typically roll-up type doors or swing-type doors. Roll-up type doors are manually opened to access the cargo within the trailer once the vehicle is restrained and the dock door is opened. Swing-type trailer doors require dock personnel to manually open the doors for loading and/or unloading the trailer prior to backing the vehicle up to the dock and restraining the vehicle.

BRIEF DESCRIPTION OF THE DRAWINGS

FIGS. 14-16 are flowcharts of loading dock operational steps configured in accordance with embodiments of the present technology.

DETAILED DESCRIPTION

Figures 1A, 1B:
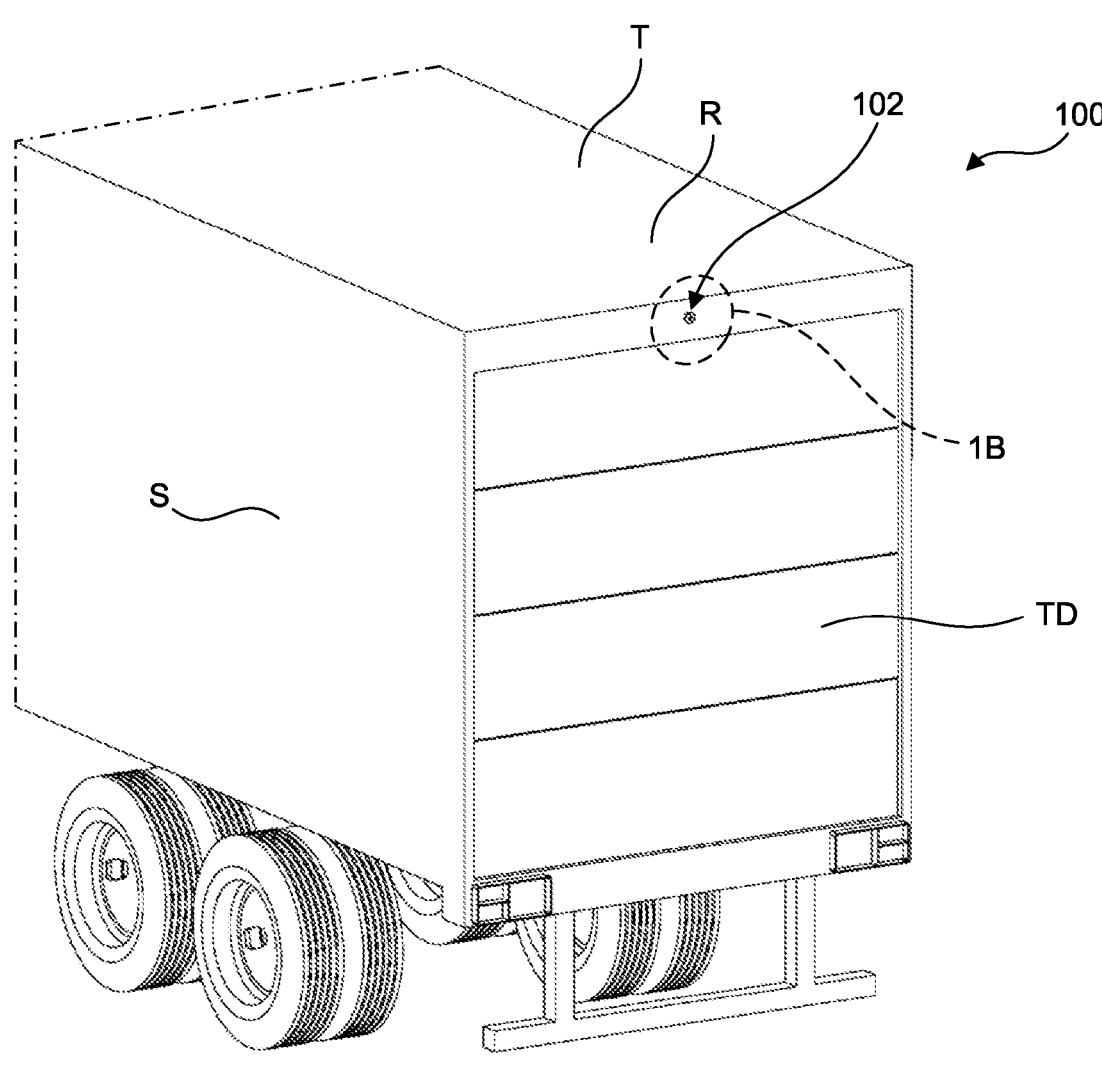
FIGS. 1A and 1B are isometric and detail views, respectively, illustrating an automated trailer door system configured in accordance with embodiments of the present technology.

The following disclosure describes various embodiments of systems for automated opening and/or closing of trailer doors at, e.g., a loading dock. The automated trailer door systems described herein may include systems positioned external to the trailer and suitable for transferring energy (e.g., kinetic energy via rotational movement, translational movement, etc.) to the trailer to open and/or close the trailer door. Systems of the present technology may include an external drive component that interacts with a corresponding component on the trailer to move the trailer door, may directly or indirectly interact with the door, and/or may have other suitable configurations. Accordingly, although the following description is generally directed to embodiments of externally interfacing automated trailer door systems for movement of the trailer door, embodiments of the present technology are not limited to such configurations and the systems described herein are suitable for use with other types of automated loading dock and/or trailer door systems.

Certain details are set forth in the following description and in FIGS. 1-16 to provide a thorough understanding of various embodiments of the present technology. In other instances, well-known structures, systems, materials and/or operations often associated with loading docks, trailer door systems and associated components are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth. The terminology used below is to be interpreted in its broadest reasonable manner, even though it is being used in conjunction with a detailed description of certain examples of embodiments of the technology. Indeed, certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the invention. Additionally, many of the details, dimensions, angles and other features shown in the Figures are merely illustrative of particular embodiments of the disclosure. Accordingly, other embodiments can have other details, dimensions, angles and features without departing from the spirit or scope of the present invention. Those of ordinary skill in the art will also appreciate that further embodiments of the invention can be practiced without several of the details described below. In the Figures, identical reference numbers identify identical, or at least generally similar, elements.

In embodiments of the present technology, an automated trailer door system 100 ("system 100") includes components associated with a trailer T (see, e.g., FIGS. 1A-2D) that can interface with one or more components associated with a loading dock (see, e.g., FIGS. 3-4F) to open and/or close a trailer door TD. Referring first to FIGS. 1A and 1B, these figures are isometric and detail views, respectively, illustrating an automated trailer door system ("system 100") for a trailer configured in accordance with embodiments of the present technology. The trailer T includes a roof R, sides S, and a drive unit 102 with an interface 104 external to the trailer T. The drive unit 102 can be located on the trailer T in a position such that a door winder subsystem 110 (see FIGS. 3 and 4A) associated with the loading dock can engage the drive unit 102 via the interface 104. In some embodiments, the drive unit 102 is located above the trailer door TD (as shown in FIG. 1A) and can be positioned near the lateral centerline of the trailer T or offset to either side of the lateral centerline. For trailers with roll-up type doors having a counterbalance 120 (see FIGS. 2A and 2B), a central lateral position of the drive unit 102 can provide a laterally balanced input to the counterbalance 120 to reduce torsional stress on the system 100.

In some embodiments, the door winder subsystem 110 can be mounted to a wall of a loading dock, e.g., the wall adjacent to a loading dock door, above the loading dock door, on a header portion, etc., and in some embodiments, the door winder subsystem 110 can be removably mounted to a cantilevered beam that enables the door winder subsystem 110 to move outwardly from the loading dock. The door winder subsystem 110 can also be mounted to a vertical column that enables the door winder subsystem 110 to move outwardly from the loading dock into position to operate the trailer door TD. The door winder subsystem 110 can be mounted to a support frame that allows the door winder subsystem 110 to move outwardly from the loading dock and articulate in different directions, (e.g., left, right, up, down, etc.) to engage the trailer T in different positions relative to the loading dock. In other embodiments, the door winder subsystem 110 can be mounted to a track system, or other suitable system. The door winder subsystem 110 can include a controller configured to receive computer readable instructions stored on a computer readable medium to control operation of the door winder subsystem 110. In some embodiments, the door winder subsystem 110 can be automatically deployed and operated (e.g., when a trailer is sensed at the loading dock and the vehicle restraint is engaged, etc.) or can be manually deployed (e.g., by a loading dock operator, a driver, etc.).

In the illustrated embodiment, the drive unit 102 has an engagement feature 106 (e.g., a hexagonal, square, star, multipoint, etc. shaped engagement feature) for positive engagement with the door winder subsystem 110 at the loading dock, such that when the door winder subsystem 110 rotates the drive unit 102 the trailer door TD is opened and/or closed. In some embodiments the engagement feature 106 on the trailer T can be a female engagement feature 106 (e.g., a socket), such that the door winder subsystem 110 of the loading dock would include a corresponding male engagement feature 122 (e.g., a protrusion, see FIG. 4A) configured to be inserted into and engage the female engagement feature 106; in other embodiments the engagement feature 106 can be a male engagement feature (e.g., a protruding member, not shown), such that the door winder subsystem 110 of the loading dock would include a corresponding female engagement feature (e.g., a socket, not shown) configured to receive and engage the male engagement feature. As described in greater detail below, the door winder subsystem 110 at the loading dock provides a rotational input to the drive unit 102, which translates to movement of the trailer door TD. For example, in some embodiments clockwise rotation of the drive unit 102 can open the trailer door TD, while counterclockwise rotation of the drive unit 102 closes the trailer door TD, or vice versa. In some embodiments, the engagement feature 106 of the drive unit 102 is tapered to assist in centering the engagement feature 122 of the door winder subsystem 110 during engagement and prior to operating the drive unit 102 to move the trailer door TD between the open and closed positions.

Figure 2A:
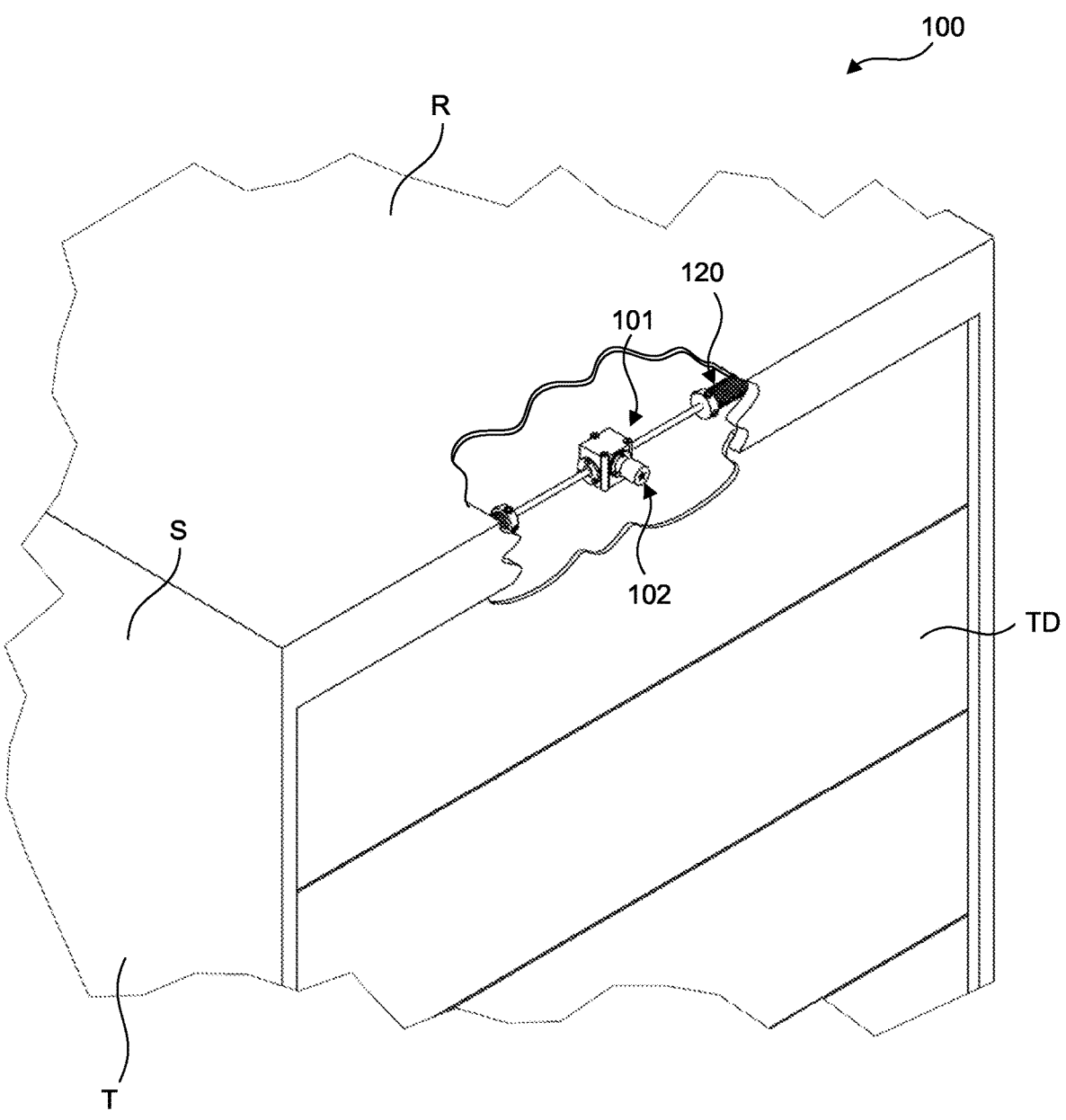
FIGS. 2A-2C are cutaway, isolated, and cross-sectional detail isometric views, respectively, of a drive assembly of the automated trailer door system of FIG. 1A.
Figure 2B:
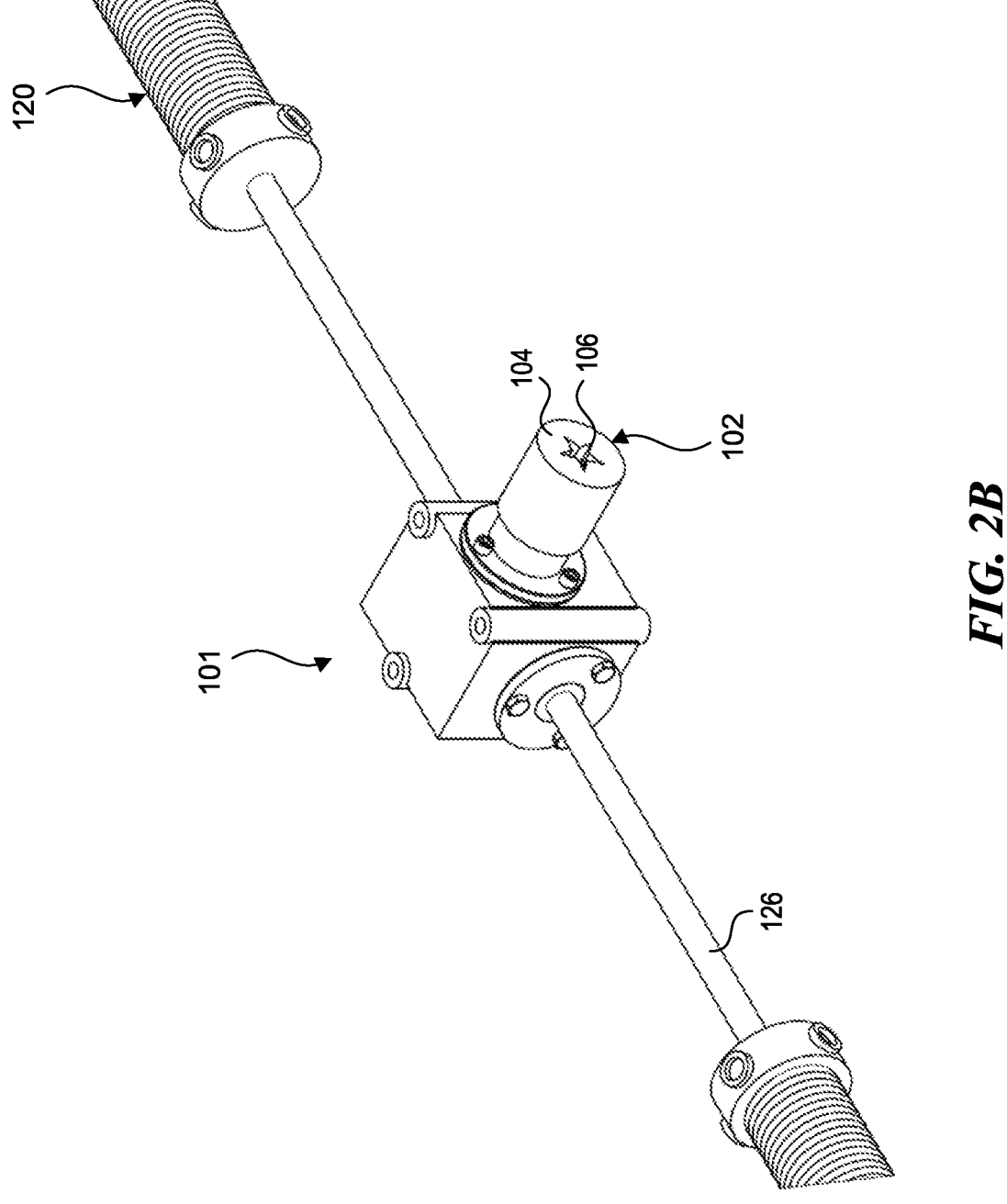
Figure 2C:
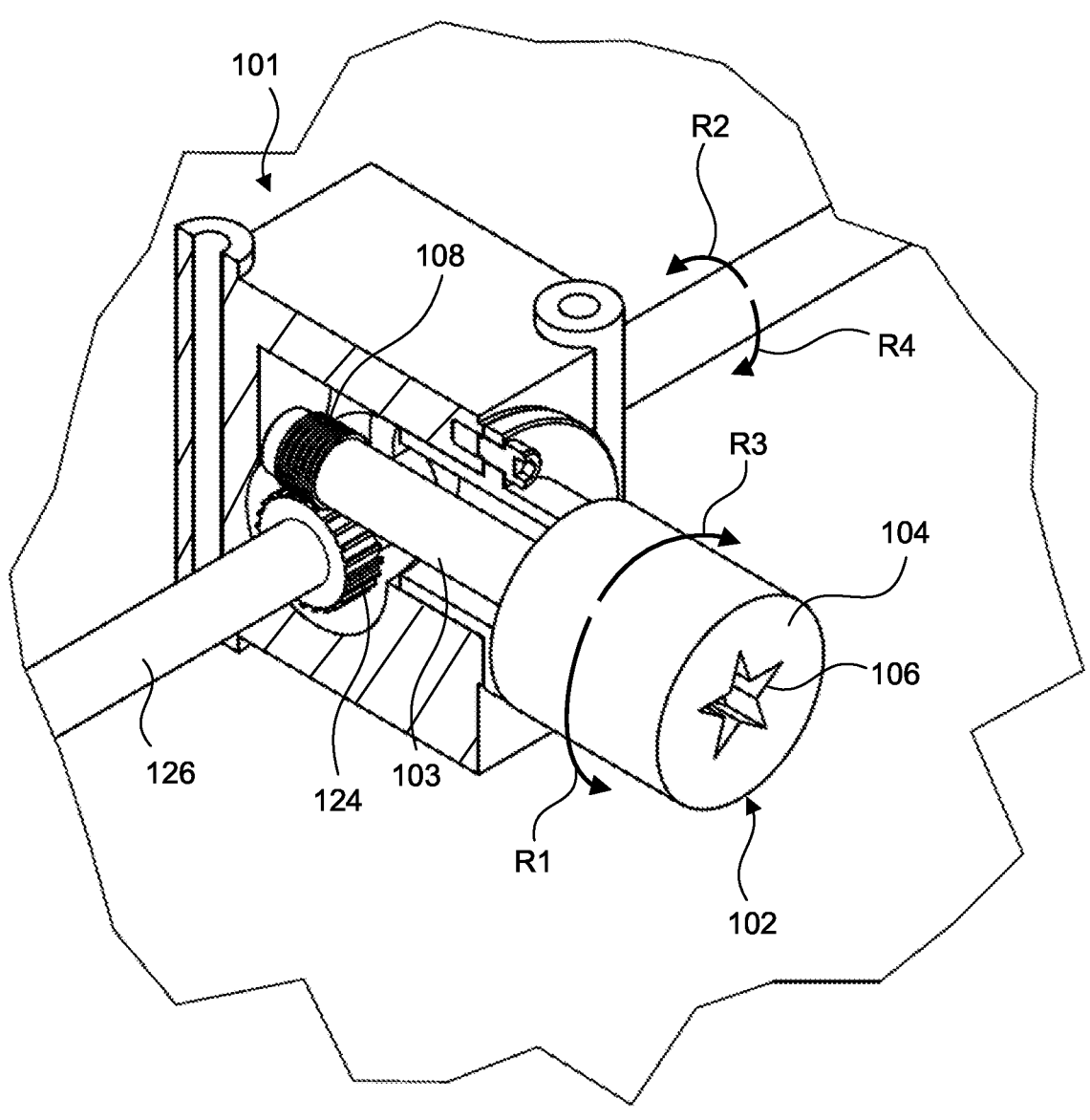
Figure 2D:
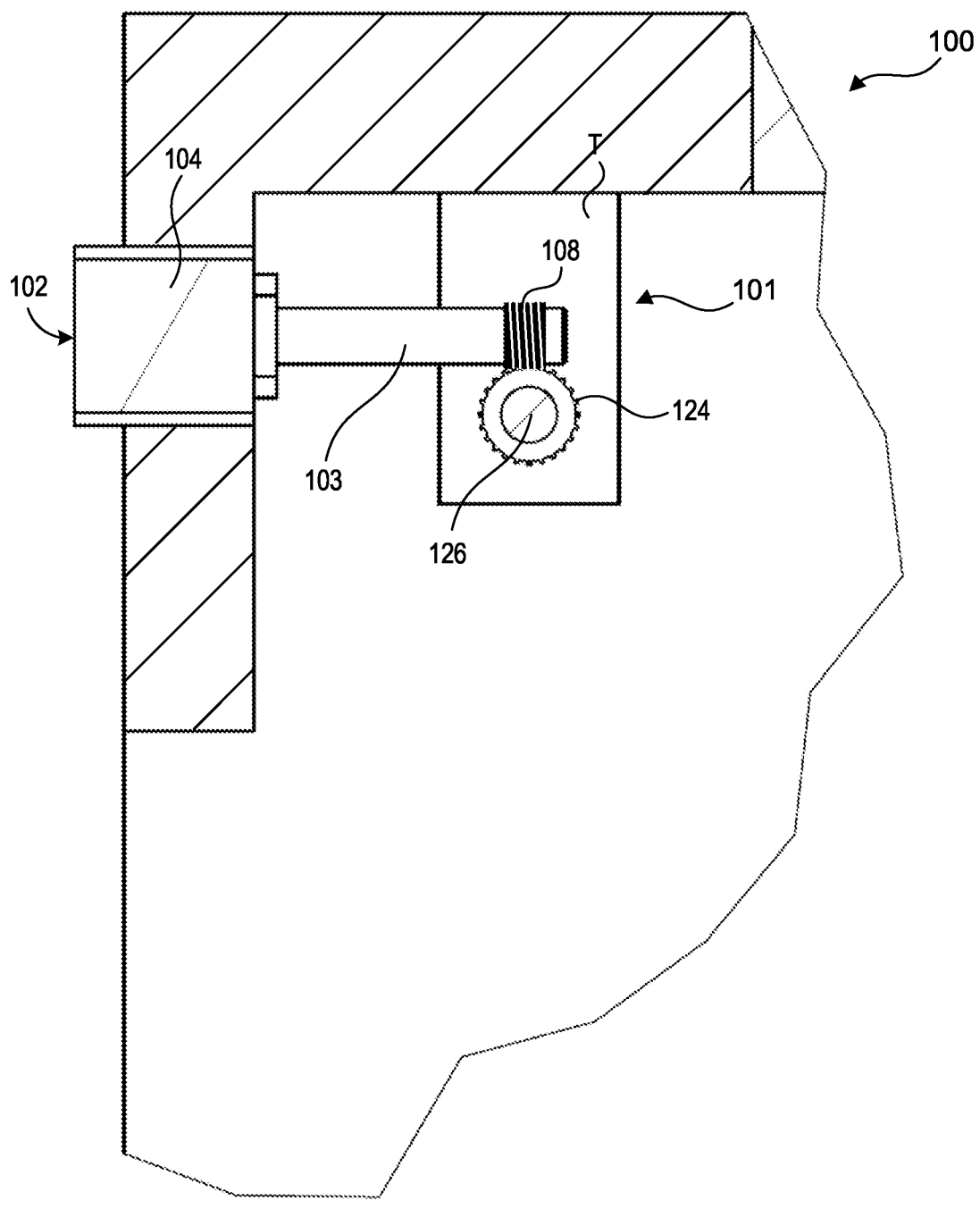
FIG. 2D is a cross-sectional side view of the automated trailer door system of FIG. 1A.

FIGS. 2A-2C are cutaway, isolated, and cross-sectional detail isometric views, respectively, of a drive assembly 101 of the system 100, and FIG. 2D is a cross-sectional side view of the system 100, in accordance with embodiments of the present technology. In embodiments with a roll-up type trailer door TD, the bias of the counterbalance 120 (FIGS. 2A and 2B) of the trailer door TD can be adjusted to be suitable for use with the system 100. For example, the counterbalance 120 of a conventional roll-up type trailer door TD exerts an opening force on the trailer door TD to assist the manual lifting of the door during opening by a user, keep the door in the open position, and reduce the tendency of the door to impact the floor of the trailer T during manual closing. In some embodiments of the present technology, automated operation of the trailer door TD by the system 100 allows for a reduced opening force bias on the trailer door TD (i.e., the counterbalance 120 is adjusted to provide less assistance while opening the door), which can improve operation of the system 100 by maintaining a consistent positive load on the door winder subsystem 110 for smooth operation, and can inhibit unauthorized human manipulation of the trailer door TD by making the trailer door TD difficult to manually open (e.g., to discouraging theft, prevent circumvention of sequential dock procedures, etc.).

As shown in FIGS. 2C and 2D, in some embodiments the drive unit 102 can be rotationally engaged with a counterbalance shaft 126 by a corresponding gear/thread arrangement so that rotation of the drive unit 102 rotates the counterbalance shaft 126 to open and/or close the trailer door TD. In some embodiments, for example, the drive assembly 101 can include a right angle/worm drive configuration. For example, the drive unit 102 can have a worm screw portion and the counterbalance shaft 126 can have a worm wheel/gear, a bevel gear, etc. that operably engages the worm screw portion 108. In the illustrated embodiment, the counterbalance shaft 126 has a worm wheel/gear 124, and the drive unit 102 includes a drive shaft 103 having a worm screw portion 108 that operably engages the worm wheel/gear 124 of the counterbalance shaft 126. As a result, rotation of the drive shaft 103 in direction R1 causes the counterbalance shaft 126 to rotate in direction R2 and open the trailer door TD, and rotation of the drive shaft 103 in direction R3 causes the counterbalance shaft 126 to rotate in direction R4 and close the trailer door TD. An example of a worm wheel/gear and worm screw configuration is a worm gear drive model 131, Style A or B from HUB CITY, a brand of Regal Beloit Corporation, located at 200 State Street, Beloit, WI 53511, among other suitable commercially available examples. Such configurations typically provide long life and high efficiency, while the positive engagement of the gear system limits the tendency of the door to backdrive (close once open) in the absence of a high opening force bias on the counterbalance. The worm wheel/gear and worm screw configurations can provide single stage drive ratios or other suitable drive ratios. In these embodiments, the system 100 may include one or more sensors (e.g., position sensors, electromechanical switches, hall effect sensors, etc., not shown) configured to detect the position of the trailer door TD (e.g., open, closed, transitioning, etc.) to provide door positioning information to, e.g., an electronic/computerized control system of the loading dock.

Figure 3:
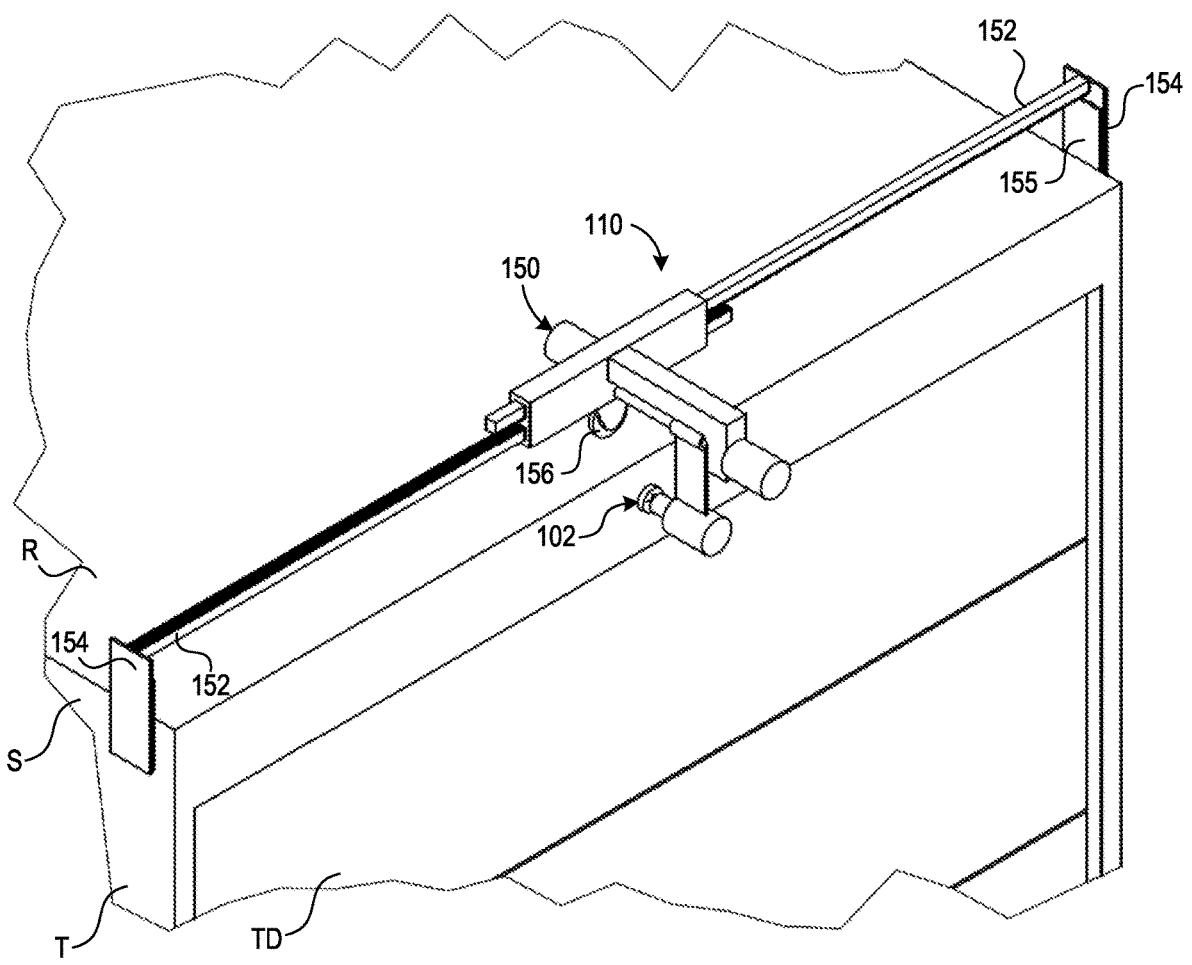
FIG. 3 is an isometric view of a door winder subsystem configured in accordance with embodiments of the present technology for use with the automated trailer door system of FIG. 1A.
Figure 4A:
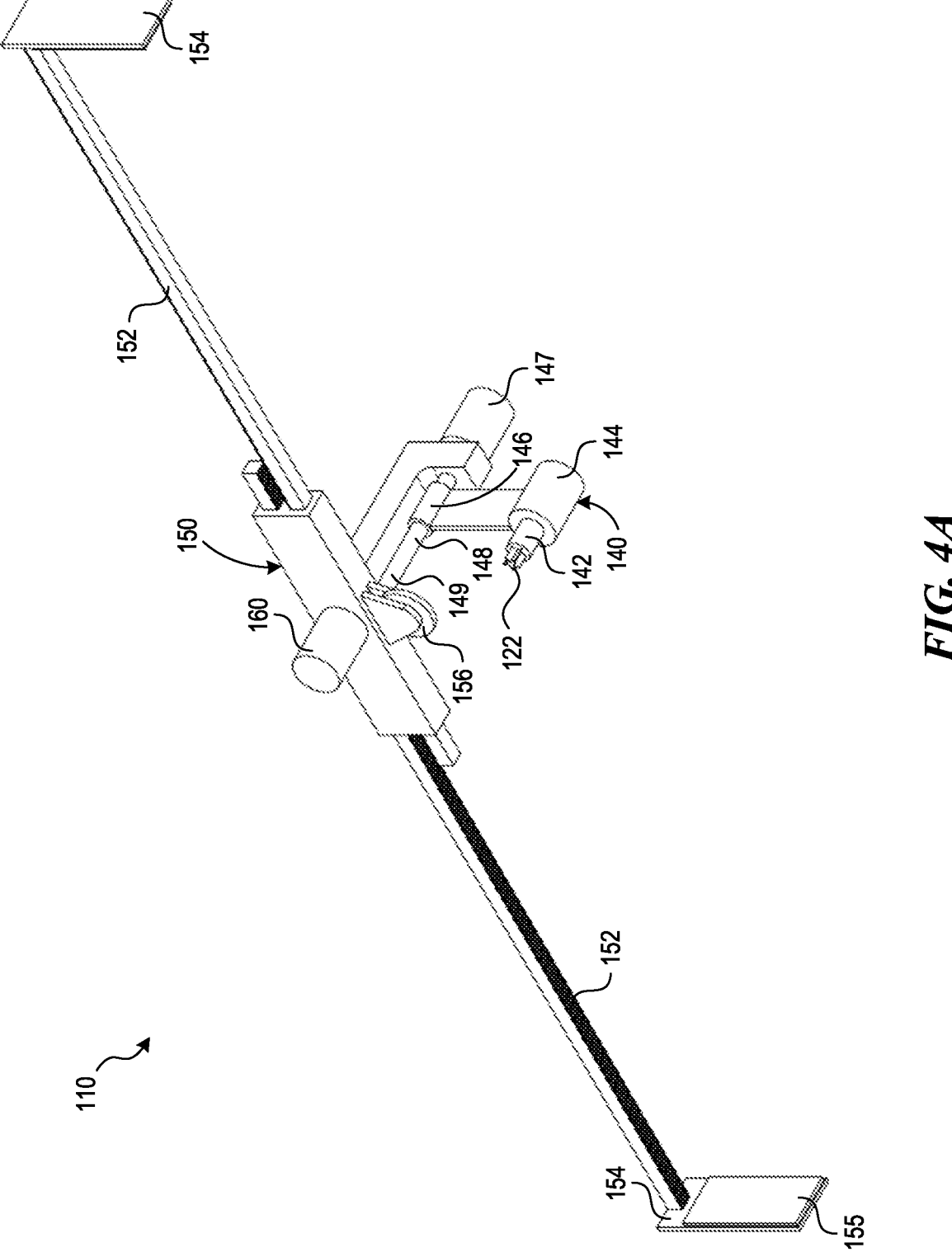
FIGS. 4A-4C are isometric, side, and front views, respectively, of the door winder subsystem of FIG. 3.
Figure 4B:
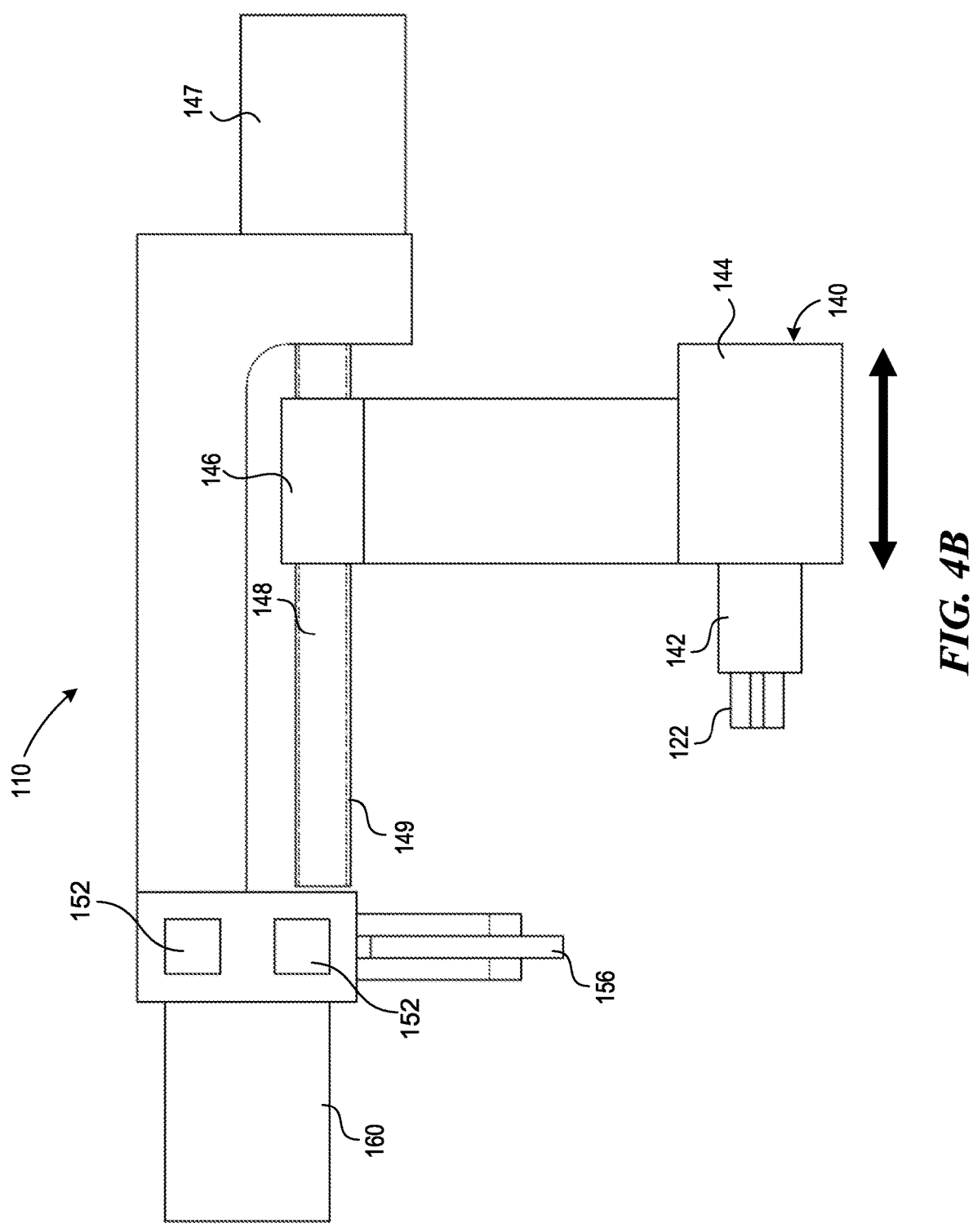
Figure 4C:
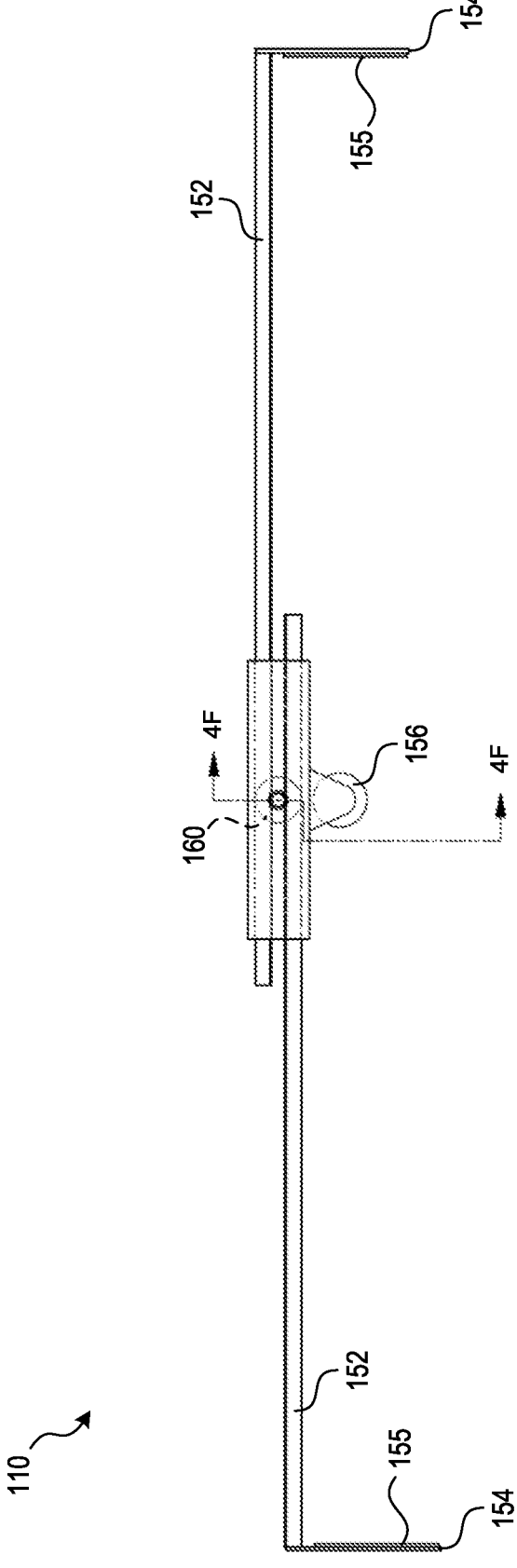
Figure 4D:
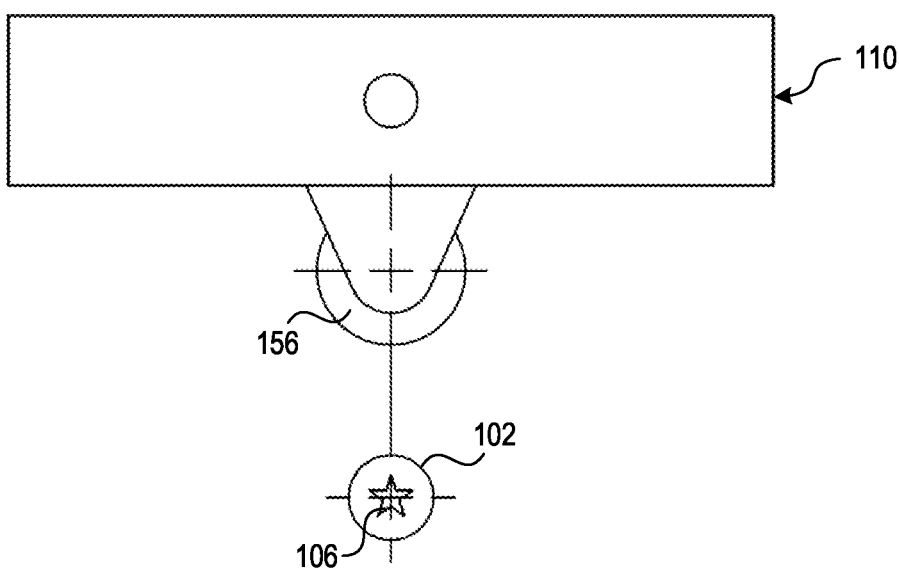
FIG. 4D is a front detail view of a portion of the door winder subsystem of FIG. 3.
Figure 4E:
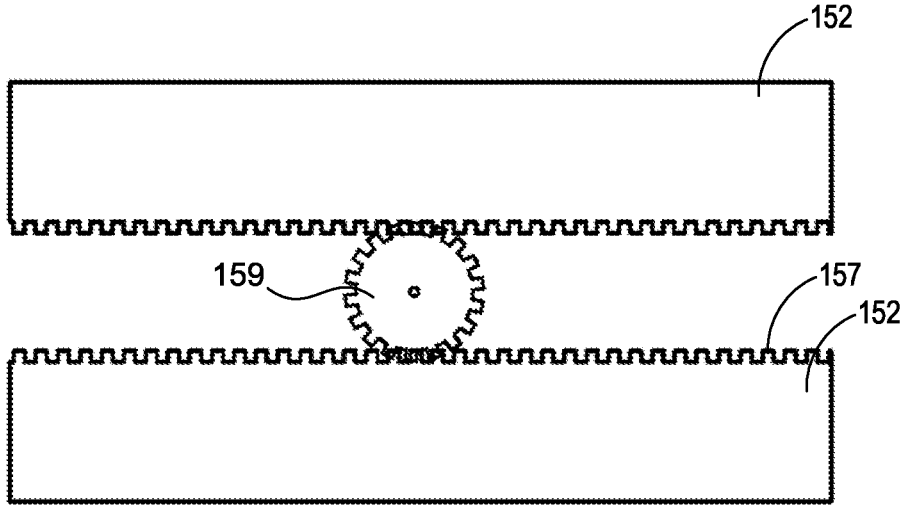
FIG. 4E is a front detail view of a rack and pinion assembly of the door winder subsystem of FIG. 3.
Figure 4F:
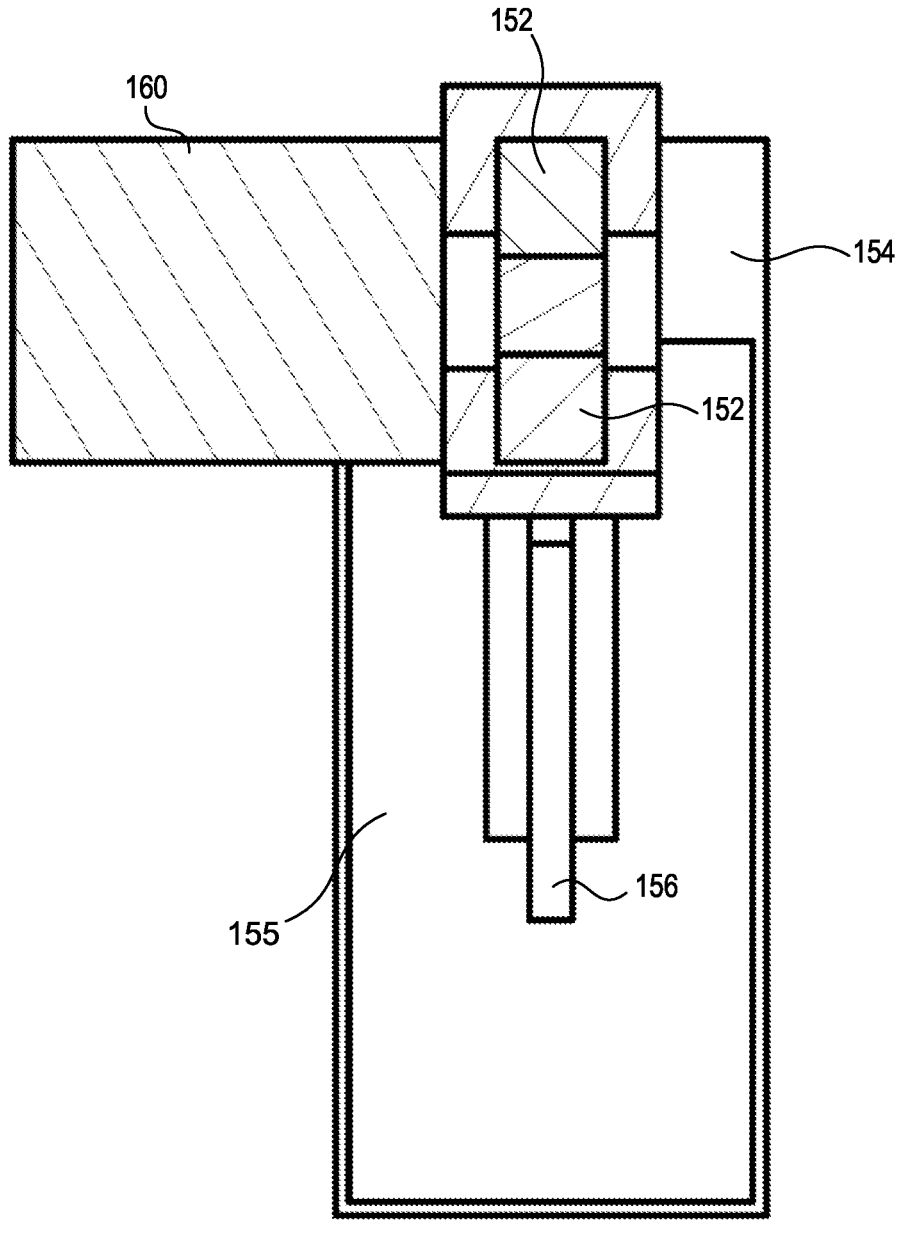
FIG. 4F is a cross-sectional side view of the door winder subsystem of FIG. 3, taken along line 4F-4F in FIG. 4C.

FIG. 3 is an isometric view of the door winder subsystem 110 operably engaged with the trailer T and configured in accordance with embodiments of the present technology for use with the system 100. FIGS. 4A-4C are isometric, side, and front views, respectively, FIG. 4D is a front detail view, and FIG. 4E is a detail front view of a rack and pinion assembly, each of the door winder subsystem 110. FIG. 4F is a cross-sectional side view of the door winder subsystem 110, taken along line 4F-4F in FIG. 4C. The door winder subsystem 110 of the loading dock can be used in combination with the trailer T to engage the drive unit 102 and open and/or close the trailer door TD. Referring first to FIG. 3, the door winder subsystem 110 can include a trailer centering subsystem 150 to assist in alignment of the engagement feature 122 (FIG. 4A) with the drive unit 102 of the trailer T to impart rotation to the drive unit 102. The trailer centering subsystem 150 has movable arms 152 that project laterally from a central portion and include alignment members 154 configured to engage the sides of the trailer T. As shown in FIGS. 4A and 4C, the arms 152 can be actuated by a centering device 160, such as a centering device having a rack and pinion drive system (see FIG. 4E) or another suitable configuration. When the arms 152 are extended and positioned so that the alignment members are spaced outwardly from the sides of the trailer T, equal retraction of the arms 152 by the centering device 160 translates the alignment members 154 toward the centerline of the trailer T to thereby center the engagement feature 122 in lateral alignment with the drive unit 102 of the trailer T (see FIG. 4D). In other embodiments, the retraction/extension of the arms 152 can be hydraulically driven, electrically driven (be, e.g., and electric motor), etc.

Referring to FIGS. 4A-4C, the door winder subsystem 110 can include a door winder unit 140 having a drive shaft 142 with the engagement feature 122 on a distal end portion thereof for insertion into and engagement with the corresponding engagement feature 106 of the drive unit 102. The drive shaft 142 of the door winder unit 140 can be rotated directly by a suitable in-line motor 144 or alternatively, in other embodiments, directly and/or indirectly by a suitable driven gear train, chain, drivebelt, or other drive system. In some embodiments, engagement of the door winder unit 140 with the drive unit 102 of the trailer T unlocks the trailer door TD for manual opening (e.g., disables a locking mechanism (not shown) of the trailer T integrated with the drive unit 102, such as by pressing the drive unit 102 axially inward). During engagement, the drive shaft 142 can extend and retract to engage or disengage, respectively, with the drive unit 102. For example, in the illustrated embodiments of FIGS. 4A and 4B, the door winder unit 140 is mounted to a winder shuttle 146 that can translate the door winder unit 140 back and forth in the general direction of a shuttle shaft 148. The shuttle shaft 148 can be motorized with a shuttle motor 147 to rotate the shuttle shaft 148 with a feature to translate the door winder unit 140 along the shuttle shaft 148 and engage the drive unit 102 of the trailer T with the engagement feature 122 of the door winder unit 140. In some embodiments, the shuttle shaft 148 can be a ball screw shaft having threads 149 and be rotationally driven by a shuttle motor 147 (e.g., an electric motor, electric stepper motor, etc.), and the shuttle 146 can include a ball nut configured to engage the threads 149 and translate along the shuttle shaft 148 in response to rotation of the shuttle shaft 148 to engage the engagement feature 122 of the door winder unit 140 with the drive unit 102 of the trailer T. In other embodiments, any suitable mechanical movement of the shuttle 146 is within the scope of the present technology, such as hydraulically driven translation, belt-driven translation, etc., or such translation can be integrated with the door winder unit 140, omitting the shuttle 146.

In operation, the door winder subsystem 110 can automatically open and close the trailer door TD by engagement with the drive unit 102. For example, after the trailer T parks at the loading dock or other location where operation of the trailer door TD is desired, the door winder subsystem 110 is lowered onto the roof R of the trailer T (FIG. 3), which can occur, e.g., at a preset distance away from a loading dock bumper face. When the door winder subsystem 110 is in position to engage the trailer T, the arms 152 are initially positioned with both of the alignment members 154 laterally outward from the sides S of the trailer T. From this initial configuration, the arms 152 are translated inwardly in opposite axial directions by a pinion gear 159 (FIG. 4E) which is rotated by the centering device 160 and engages the rack teeth 157 on each of the arms 152 such that each of the alignment members 154 moves laterally inward toward the centerline of the trailer T. If the trailer T is offset to either side of the centerline of the door winder subsystem (e.g., offset from the centerline of the loading dock), one of the alignment members 154 of the arms 152 will contact the respective side S of the trailer T before the other of the alignment members 154 contacts the other side S of the trailer T, and the continued retraction of the arms 152 will laterally move the door winder subsystem 110 toward the centerline of the trailer T until the other alignment member 154 contacts the opposite side S of the trailer T, thereby centering the door winder subsystem 110 with the winder 122 in coaxial alignment with the engagement feature 106. The trailer centering subsystem 150 may include friction reducing component, such as a wheel 156 that contacts the roof R of the trailer T to assist the centering of the door winder subsystem 110 as the arms 152 retract (see FIGS. 3, 4A, 4C, 4D, and 4F). The wheel 156 can include a slot to allow a vertical motion of the door winder subsystem 110 with respect to the roof R to accommodate differences in height between the roof R and the engagement feature 106.

Trailers that are skewed with respect to the loading dock centerline on approach can also be engaged with the door winder subsystem 110 by use of the trailer centering subsystem 150. In these embodiments, the alignment members 154 of the arms 152 can have flat contacts 155 (see FIGS. 4A and 4C) that permit longitudinal sliding of the alignment member 154 along the side S of the trailer T, thereby rotating the door winder subsystem 110 so that the arms 152 are substantially perpendicular to the centerline of the trailer T when both of the alignment members 154 contact the sides S of the trailer T. The flat contacts 155 of the alignment members 154 can have a friction reducing surface (e.g., Teflon coated, plastic, etc.) that contacts the sides S of the trailer T to assist with the longitudinal sliding of the alignment member 154. Once the door winder subsystem 110 is centered and aligned, the drive shaft 142 of the door winder unit 140 can drive the engagement feature 122 outward into engagement with the drive unit 102 of the trailer T to open/close the trailer door TD.

Figure 5A:
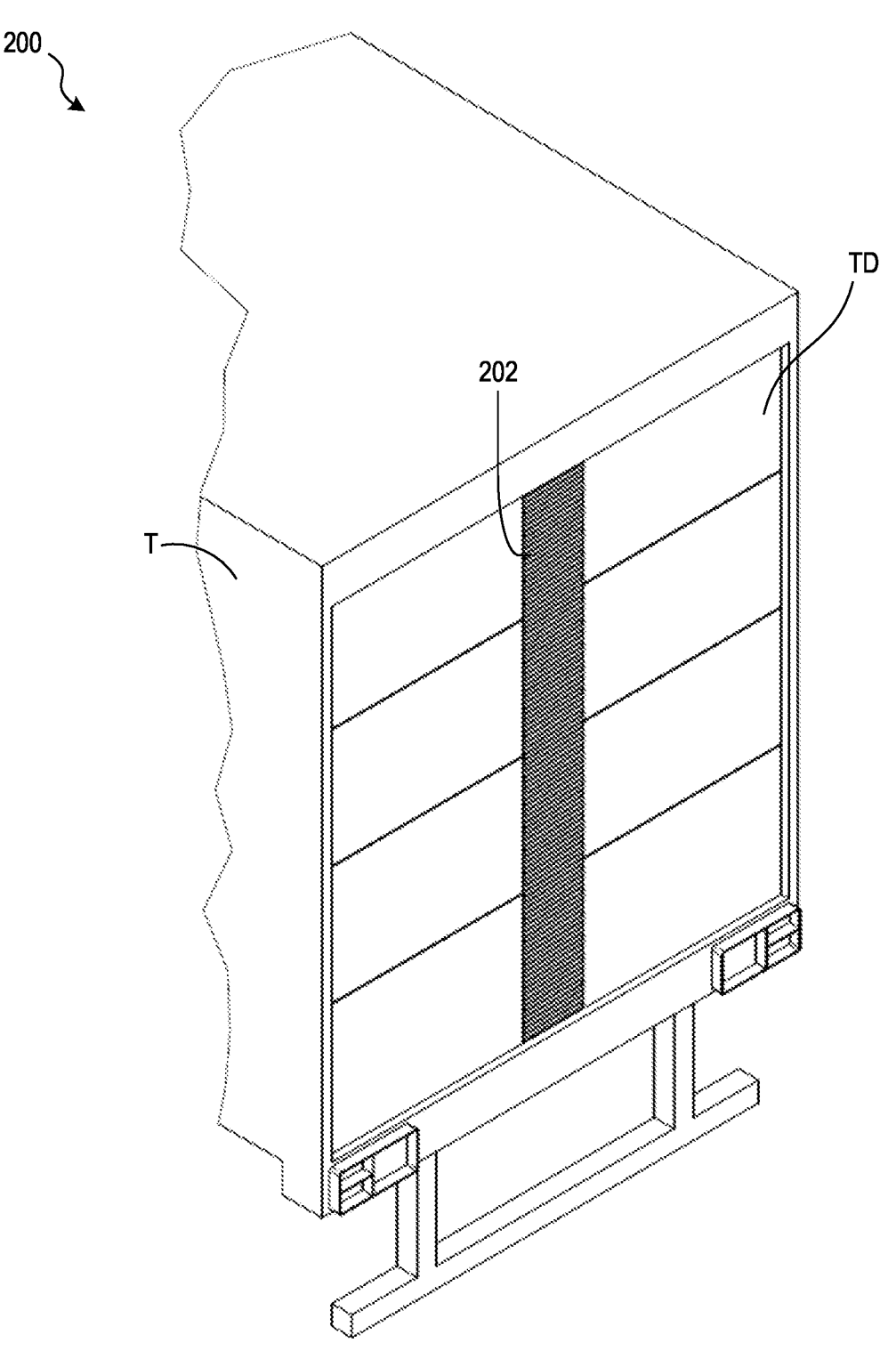
FIGS. 5A and 5B are isometric views illustrating various components and features of an automated trailer door system configured in accordance with other embodiments of the present technology.
Figure 5B:
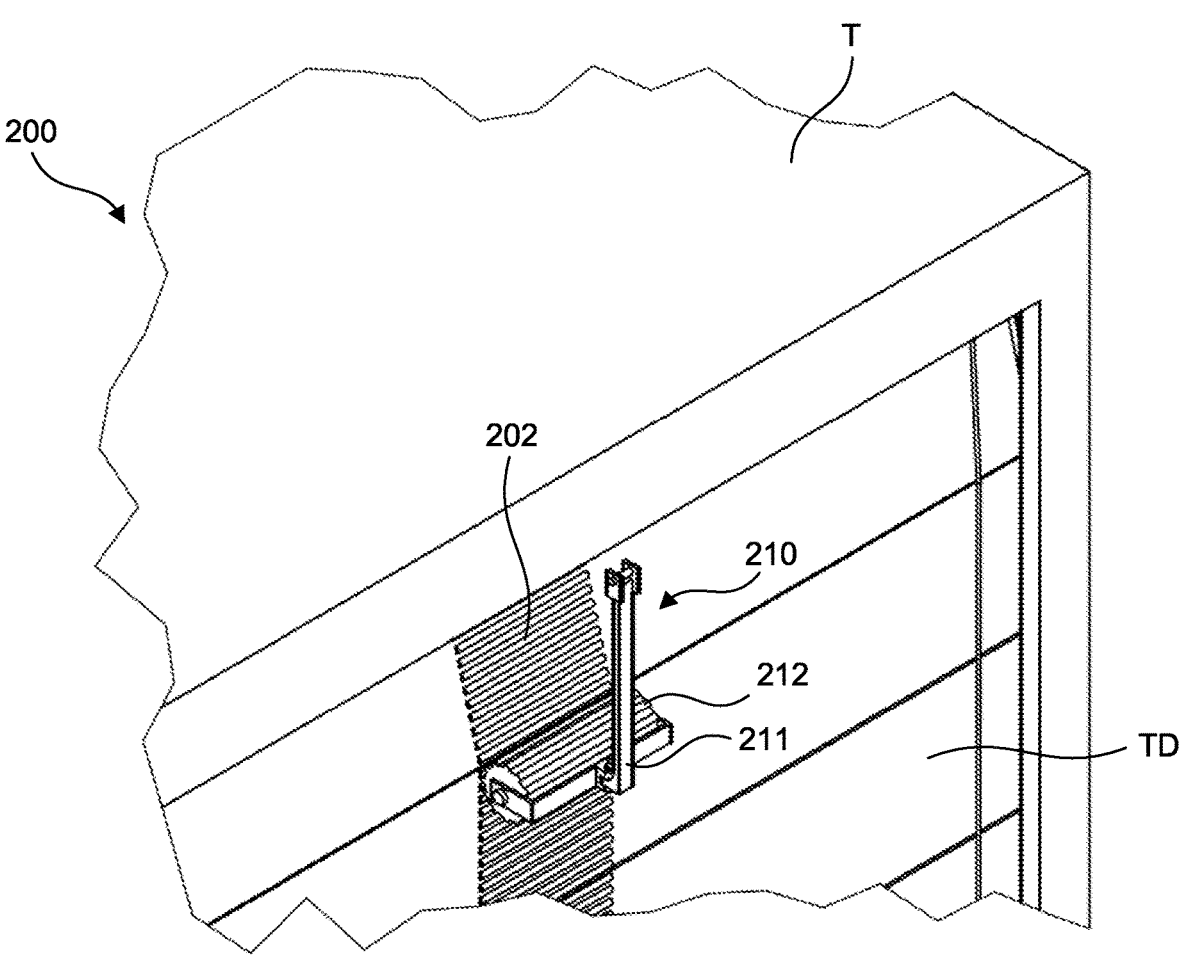
Figure 5C:
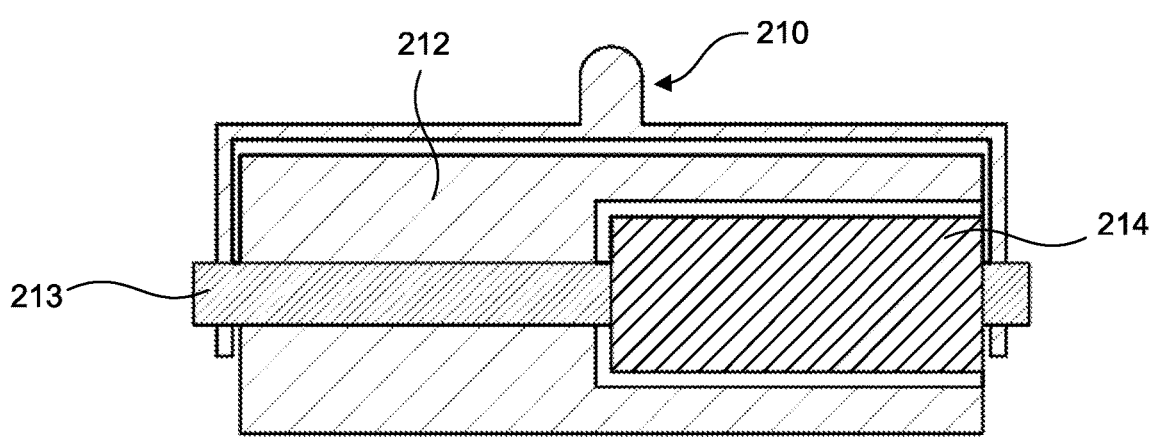
FIG. 5C is a cross-sectional front view of a roller assembly of the automated trailer door system of FIG. 5B.
Figure 5D:
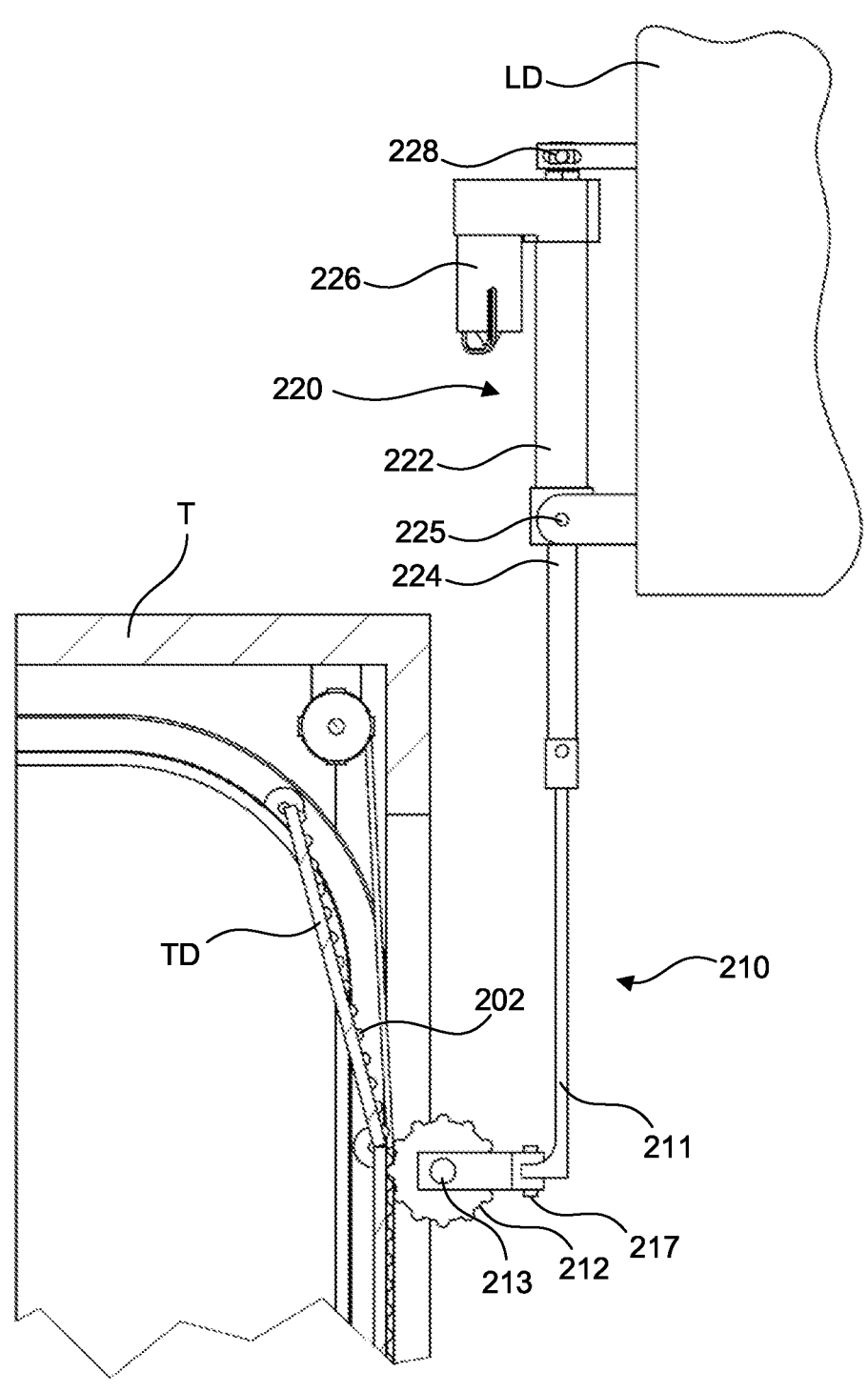
FIGS. 5D and 5E are side views illustrating various components and features of an automated trailer door system configured in accordance with further embodiments of the present technology.
Figure 5E:
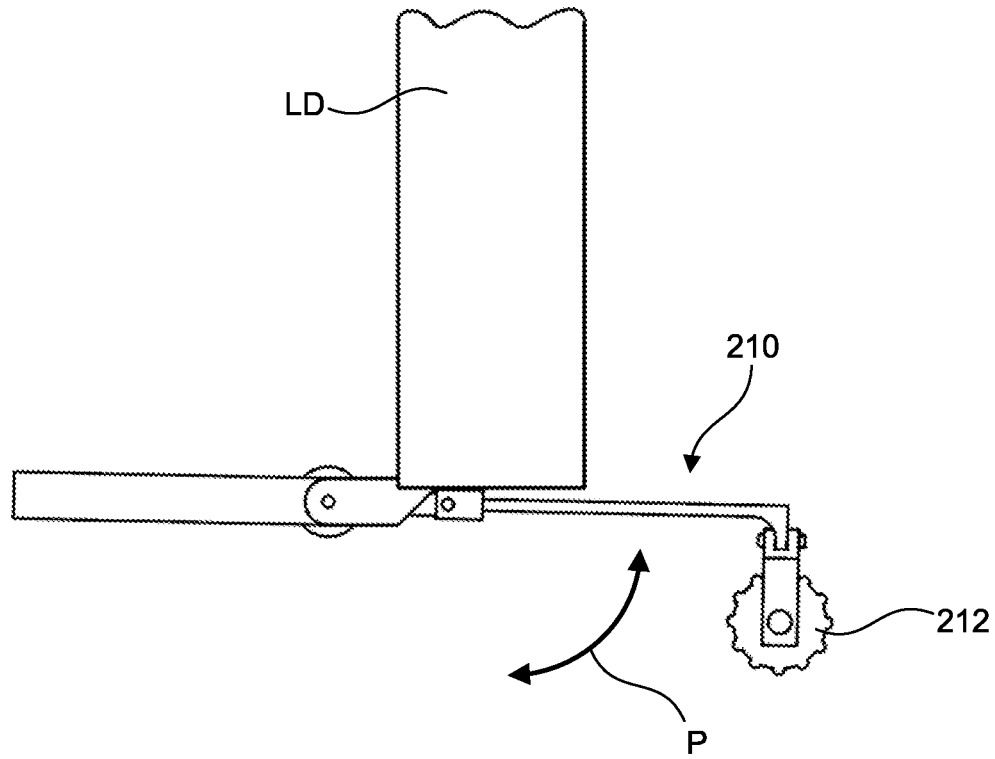

FIGS. 5A and 5B are isometric views illustrating various components and features of an automated trailer door system 200 ("system 200") configured in accordance with other embodiments of the present technology for use with a loading dock. FIG. 5C is a cross-sectional front view of a roller assembly of the system 200, and FIGS. 5C-5E are side views of the system 200. The system 200 includes components associated with the trailer T (e.g., FIG. 5A) that can interface with one or more door roller subsystems 210 associated with the loading dock (e.g., FIGS. 5B-6D) to open and/or close the trailer door TD. As shown in FIG. 5A, in some embodiments, the trailer T includes a contact surface, patch, or pad 202 (hereinafter the "contact patch 202") on an exterior portion of the trailer door TD. The contact patch 202 can be a portion of the surface of the trailer door TD, a separate high friction, toothed, and/or grooved surface applied to the door, or a contact component attached to the door. In some embodiments, the contact patch 202 is a ribbed surface that is configured to interface with a toothed roller 212 (see, e.g., FIGS. 5B and 5D). In other embodiments, the contact patch 202 can extend below the bottom of the trailer door TD so the roller 212 can engage the contact patch 202 when the trailer door TD is fully open (thereby occluding the contact patch adjacent to the trailer door TD), or a separate tab can be attached to the bottom of the trailer door TD for engagement of the door roller subsystem 210 with the trailer door TD when the trailer door TD is fully open.

As shown in FIG. 5B, the door roller subsystem 210 of the loading dock can be used in conjunction with the trailer T to engage the contact patch 202 and rotate to thereby open and/or close the trailer door TD. The door roller subsystem 210 can include an arm 211 operably coupled to the roller 212 having features for engaging the contact patch 202 of the trailer door TD (e.g., gear teeth, rubber, knurling, grit, and/or other high friction surface treatment, etc.). As shown in FIG. 5C, in some embodiments the roller 212 can be rotated directly by a suitable motor 214 (e.g., and electric motor) positioned within the roller 212 to rotate a shaft 213 extending through and coupled to the roller 212, or in other embodiments, the roller 212 can be rotated indirectly by a suitable gear train, chain, a drivebelt 216 (see FIGS. 6C and 6D), or other suitable system.

FIG. 5D shows an articulation system 220 for manipulating the door roller subsystem 210 in accordance with embodiments of the present technology. The articulation system 220 includes an actuator 222 with a motor 226 configured to extend and retract an actuator shaft 224 operably coupled to the door roller subsystem 210. The articulation system 220 is configured to move the door roller subsystem 210 in a generally vertical direction (up or down) to accommodate, e.g., different trailer heights, different contact patch configurations, etc., and/or to move the door roller subsystem 210 up and clear from the trailer door TD opening for unloading and loading of the trailer T. The articulation system 220 can be pivotably coupled to the loading dock LD using a pinned coupling 225 or other suitable coupling. The articulation system 220 can include a slotted top mount 228 that, together with the pinned coupling 225, allows the roller subsystem 210 to accommodate variation in distance of the contact patch 202 away from the loading dock LD as the trailer door TD is opened/closed. For example, the slotted top mount 228 can be biased inward toward the loading dock LD to apply an outward force on the roller 212 to increase contact with the contact patch 202 as the roller 212 opens and closes the trailer door TD. The bias of the top mount 228 can ensure continuous contact of the roller 212 with the contact patch 202. The roller 212 can further be operably pivotally mounted to the arm with a pin 217, permitting rotation of the roller 212 in a horizontal plane to accommodate skewing of the contact patch 202. As shown in FIG. 5E, in some embodiments the articulation system 220 can be disconnected from the slotted top mount 228 and rotated about the pinned coupling 225 in a pivot direction P to move the door roller subsystem 210 away from the trailer door TD opening.

Figure 6A:
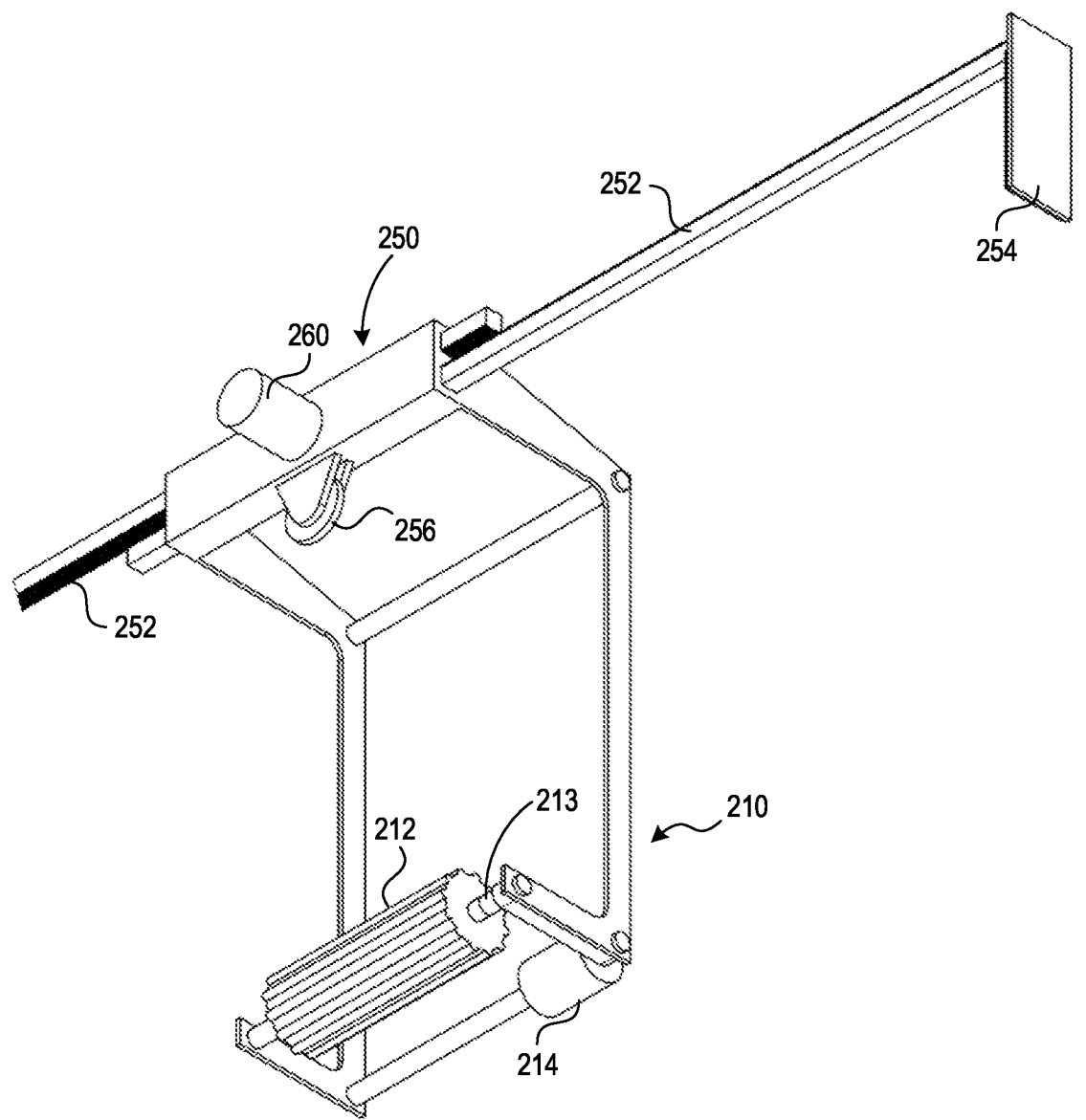
FIG. 6A is an isometric view and 6B is a side view illustrating various components and features of an automated trailer door system configured in accordance with embodiments of the present technology.
Figure 6B:
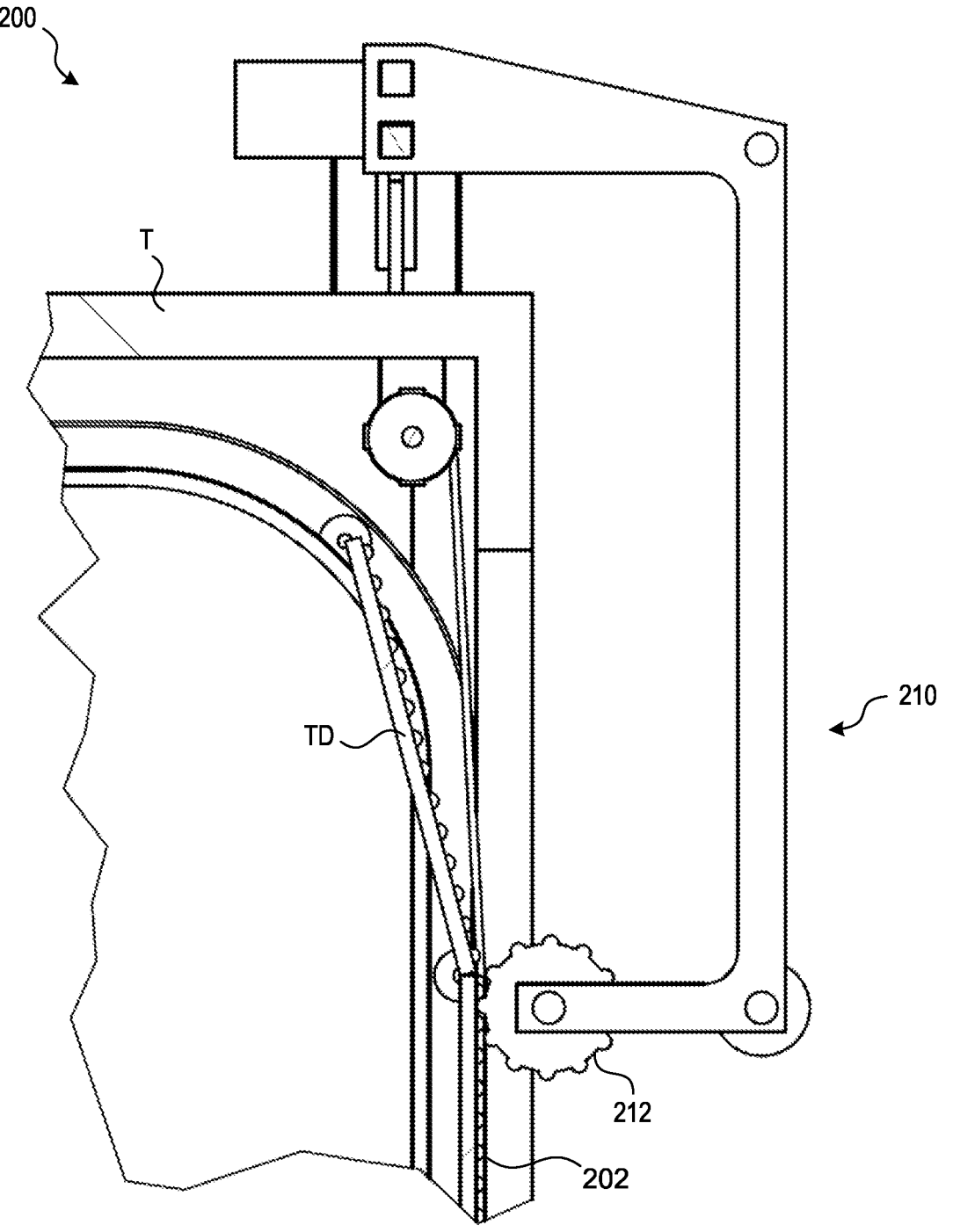
FIGS. 6C and 6D are front and side views, respectively, of a portion of the automated trailer door system of FIGS. 6A and 6B.
Figure 6C:
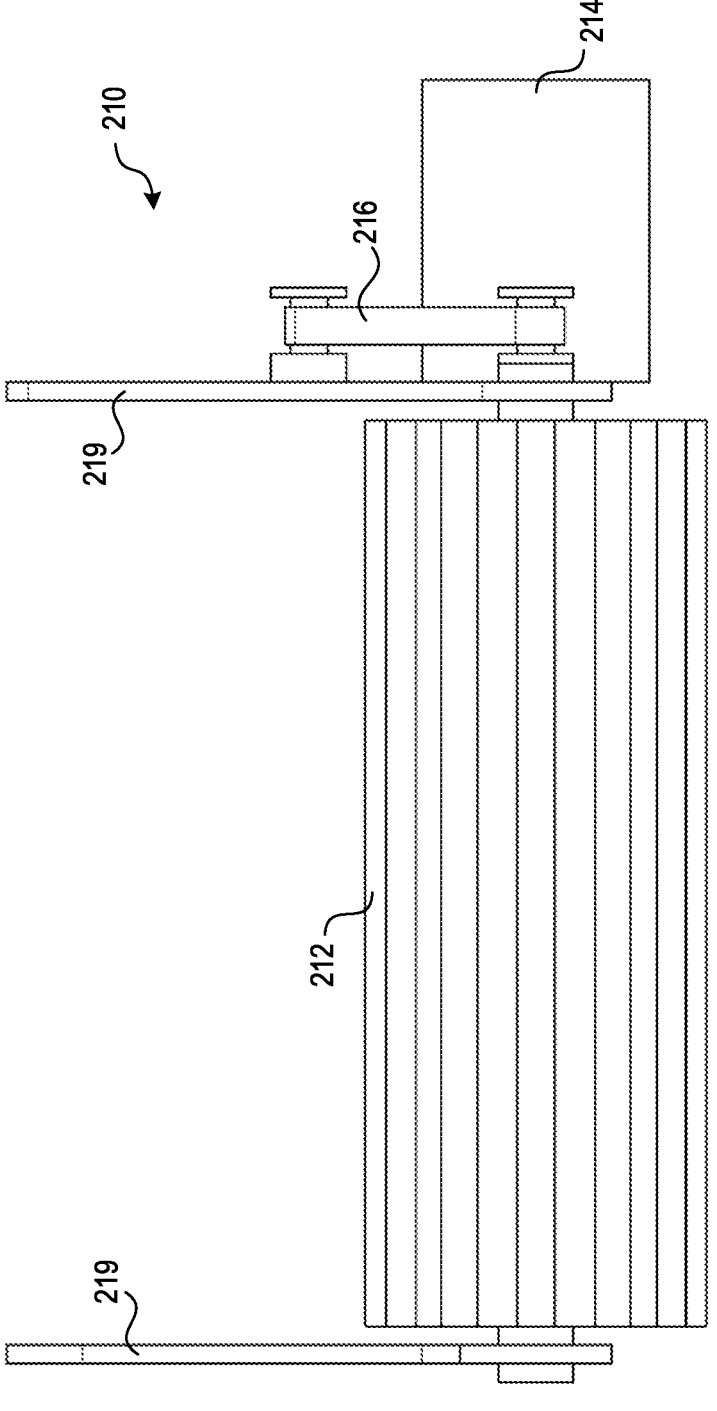
Figure 6D:
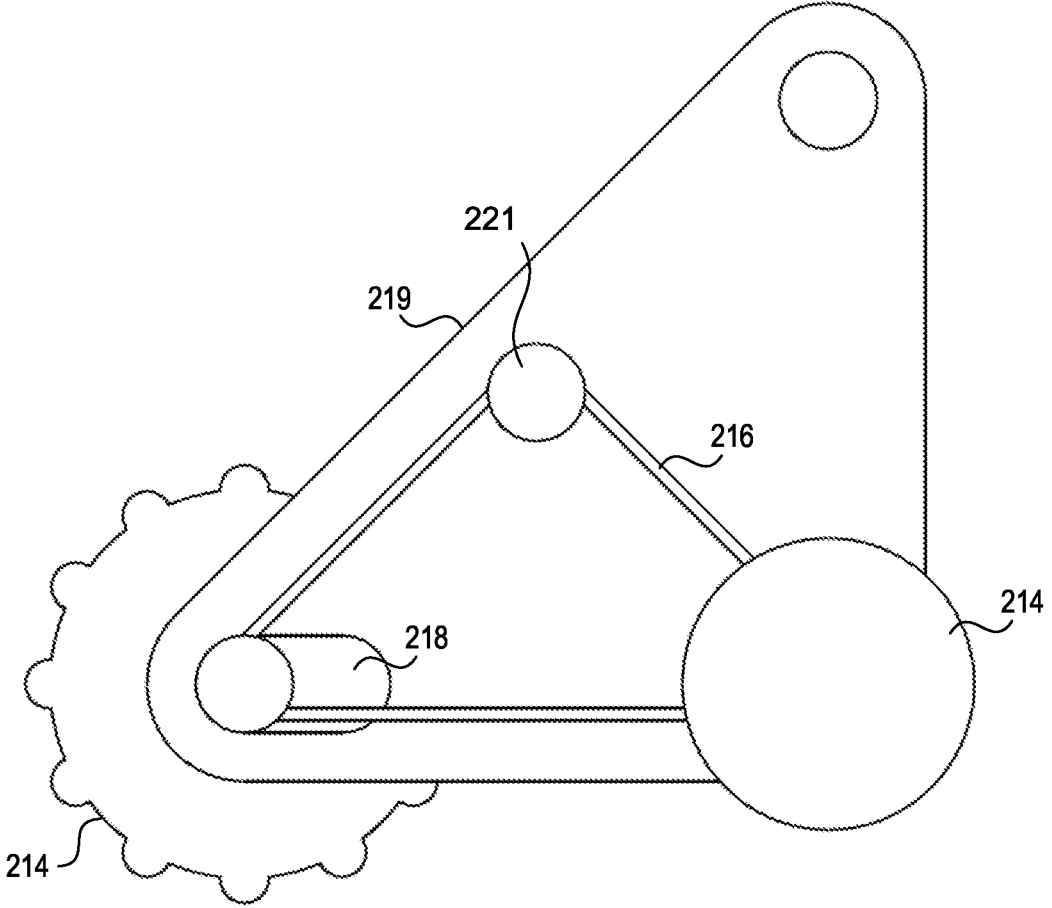

FIGS. 6A and 6B are side elevation views, and FIGS. 6C and 6D are front elevation and side elevation views, respectively, of trailer centering subsystem 250 configured in accordance with embodiments of the present technology. The embodiments shown in FIGS. 6C and 6D are similar to the embodiments shown in FIGS. 6A and 6B, except the position of the motor differs (e.g., the motor is mounted on the inside of the plates vs. outside the plates, etc.). The trailer centering subsystem 250 has certain components and features that are similar to the trailer centering subsystem 150 described above with respect to FIGS. 3-4F. The trailer centering subsystem 250 is configured to assist in alignment of the roller 212 with the contact patch 202 of the trailer door TD to open/close the trailer door TD by rotation of the roller 212. The trailer centering subsystem 250 has arms 252 that project laterally from a central portion and include alignment members 254 configured to interface with the sides S of the trailer T.

As shown in FIG. 6A, the arms 252 can be actuated by a centering device 260, such as a centering device having a rack and pinion drive system (see FIG. 4E) or another suitable configuration. The equal retraction of the arms 252 by the centering device 260 translates the alignment members 254 positioned at the distal ends of the arms 252 toward the centerline of the trailer T to thereby positions the roller 212 in lateral alignment with the contact patch 202 of the trailer TD. In other embodiments, the retraction/extension of the arms 252 can be motorized, hydraulic, etc. The trailer centering subsystem 250 may include friction reducing component, such as a wheel 256 that rollably contacts the roof R of the trailer T to assist the centering of the door roller subsystem 210 as the arms 252 retract and contact the sides of the trailer. As shown in FIGS. 6A, 6C and 6D, the roller 212 can be rotated by a motor 214 using a drivebelt 216, and the roller 212 can be slidingly operably coupled to carrying brackets 219 within slots 218 with biasing members (e.g., compression springs; not shown) configured to bias the roller 212 away from the motor 214 and improve engagement of the roller 212 with the contact patch 202. In embodiments with a biased coupling in the slots 218, the drivebelt 216 can be routed over an idler roller 221 to improve engagement of the drivebelt 216 with the roller 212 during movement of the roller 212 within the slots 218. In these embodiments, the idler roller 221 can be biased to keep tension on the drivebelt 216 during movement of the roller 212, or the drivebelt 216 may have a belt tensioner (not shown). The slots 418 in the carrying brackets 419 also allow for the roller 412 to skew relative to the carrying brackets 419 as necessary so that the roller 212 engages across the length of the roller 212 with the contact patch 402 on the trailer door TD (e.g., when the trailer T is not aligned with the loading dock, etc.).

Figure 7A:
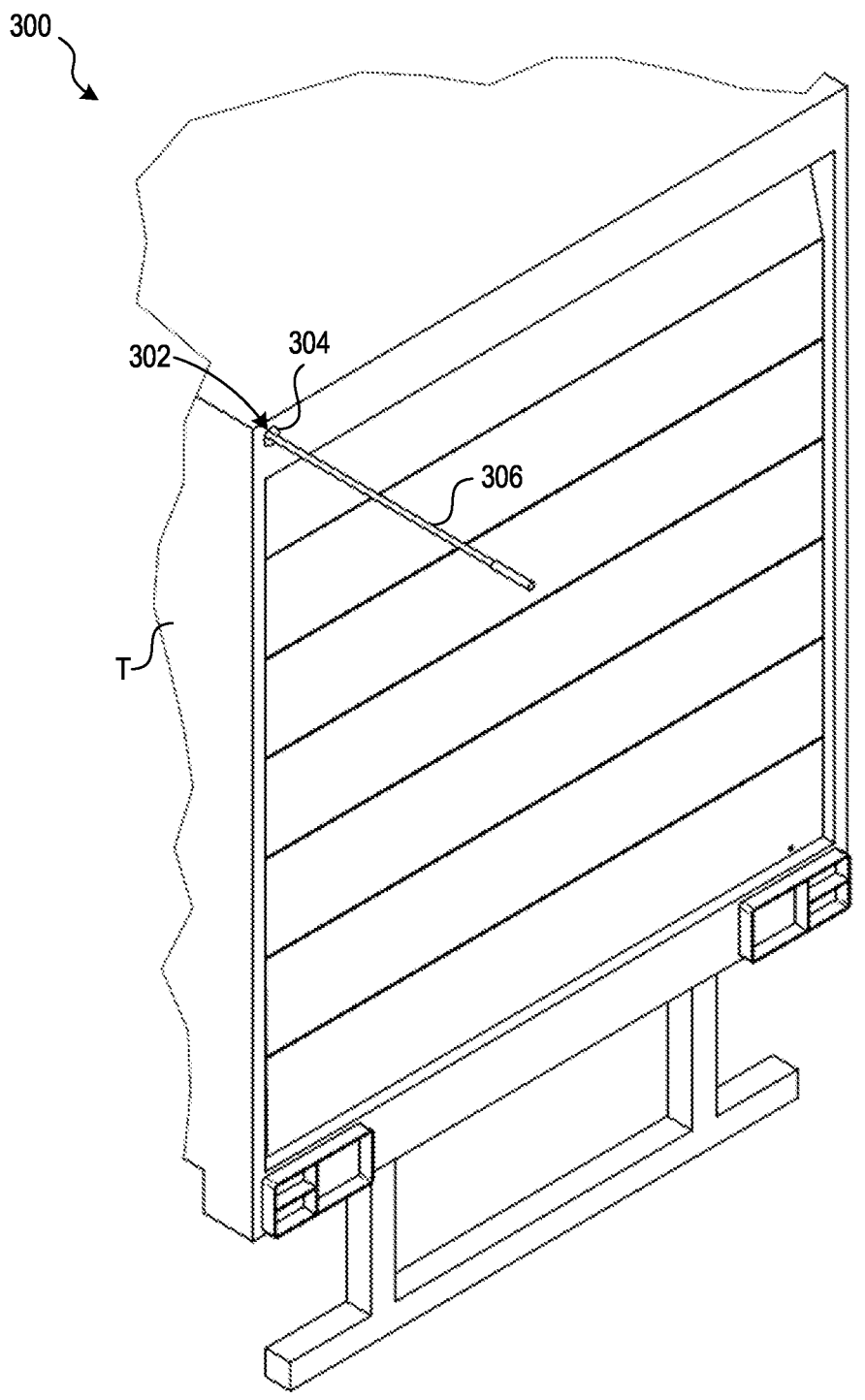
FIG. 7A is an isometric view and FIGS. 7B and 7C are detail isometric views illustrating various components and features of an automated trailer door system configured in accordance with other embodiments of the present technology.
Figure 7B:
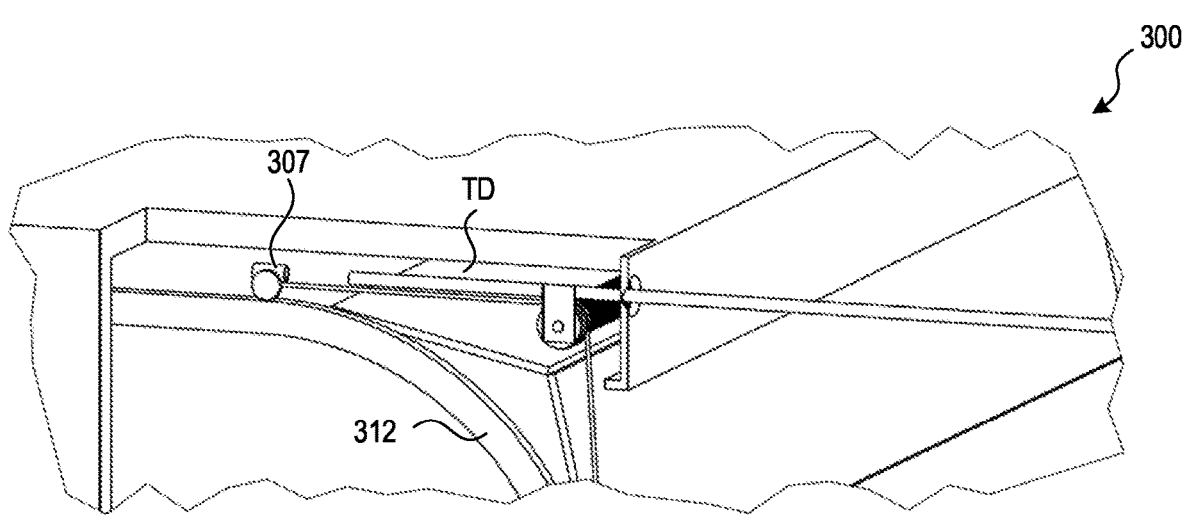
Figure 7C:
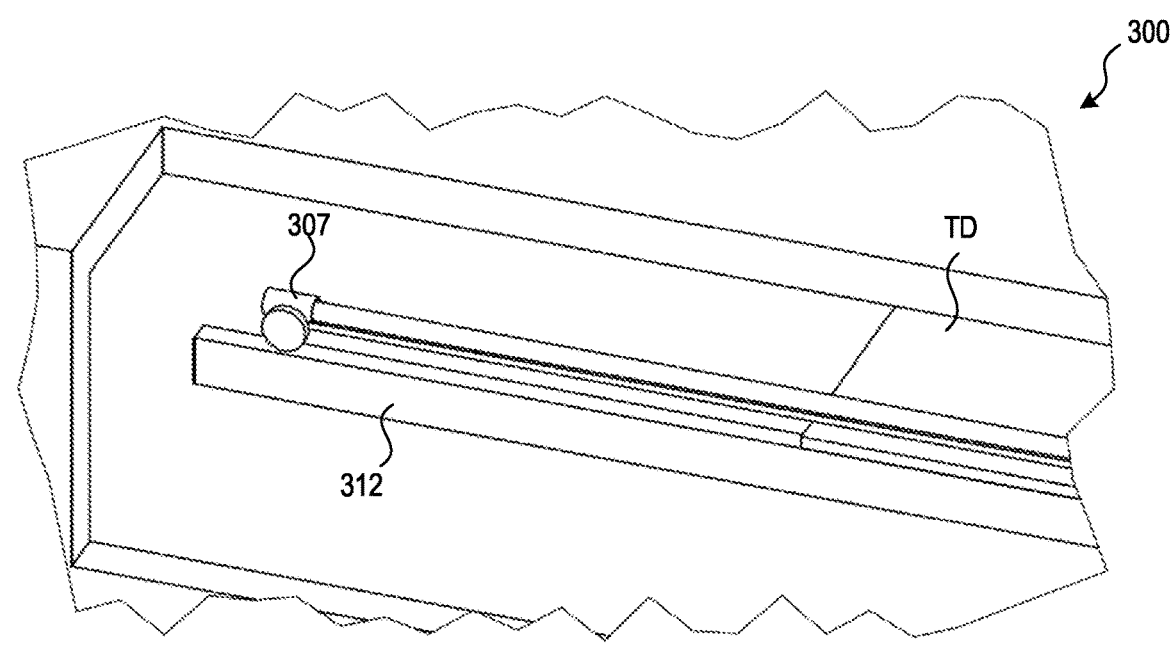

FIG. 7A is an isometric view and FIGS. 7B and 7C are detail isometric views of an automated trailer door system 300 ("system 300") configured in accordance with embodiments of the present technology. The system 300 includes components associated with the trailer T that can interface with one or more door pusher systems associated with the loading dock to open and/or close the trailer door TD. For example, the trailer T can include a pusher interface 302 (e.g., an aperture 304) on an exterior surface of the trailer T. The pusher interface 302 can be located on the trailer T in a position where the internal components of the trailer door TD opening system can be manipulated by a rod 306 of the door pusher system. For example, in one embodiment, the pusher interface 302 is located on the door frame above the trailer door TD, laterally offset from the centerline of the trailer T, and can be generally aligned with the ceiling portion of one of the door tracks 312 internal to the trailer T (FIGS. 7A and 7B). The pusher interface 302 can be configured to axially receive the door pusher rod 306 of the loading dock that is extended (pushed) outwardly from the dock face to open the trailer door TD, and retracted (pulled) to close the trailer door TD. A bracket 307 (see FIGS. 7B and 7C) is coupled to the trailer door TD and can be used to engage the door pusher rod 306 through the pusher interface 302 so that translation of the door pusher rod 306 moves the trailer door TD. The pusher interface 302 can be tapered to assist in centering the door pusher rod 306 with the aperture 304. In these embodiments, the trailer door TD can be biased by a counterbalance (e.g., the counterbalance 120 in FIG. 2B) toward the closed position such that removal of the door pusher rod 306 closes the door without needing to engage with and pull a component of the system 300 to close the trailer door TD. The reduced biasing of the counterbalance allows the door pusher rod 306 to remain in positive contact with the pusher interface 302 and may discourage unauthorized users from manually opening the trailer door TD. The system 300 can include a trailer centering subsystem, similar to the trailer centering subsystem 150 described above, to assist in alignment of the door pusher rod 306 with the pusher interface 302 of the trailer door TD. The loading dock can further include a control system to manipulate the door pusher rod 306 based on a sensed position of the trailer door TD.

Figure 8A:
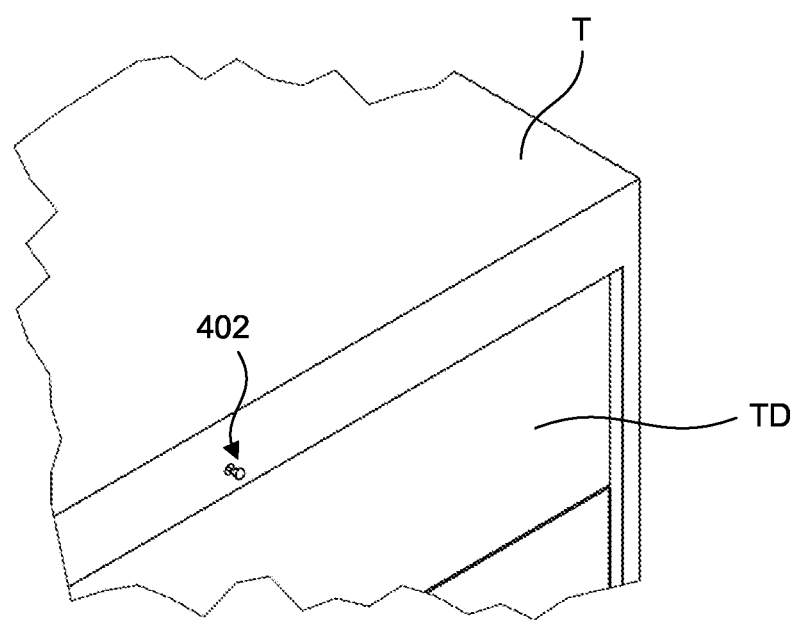
FIGS. 8A and 8B are isometric views illustrating various components and features of an automated trailer door system configured in accordance with further embodiments of the present technology.
Figure 8B:
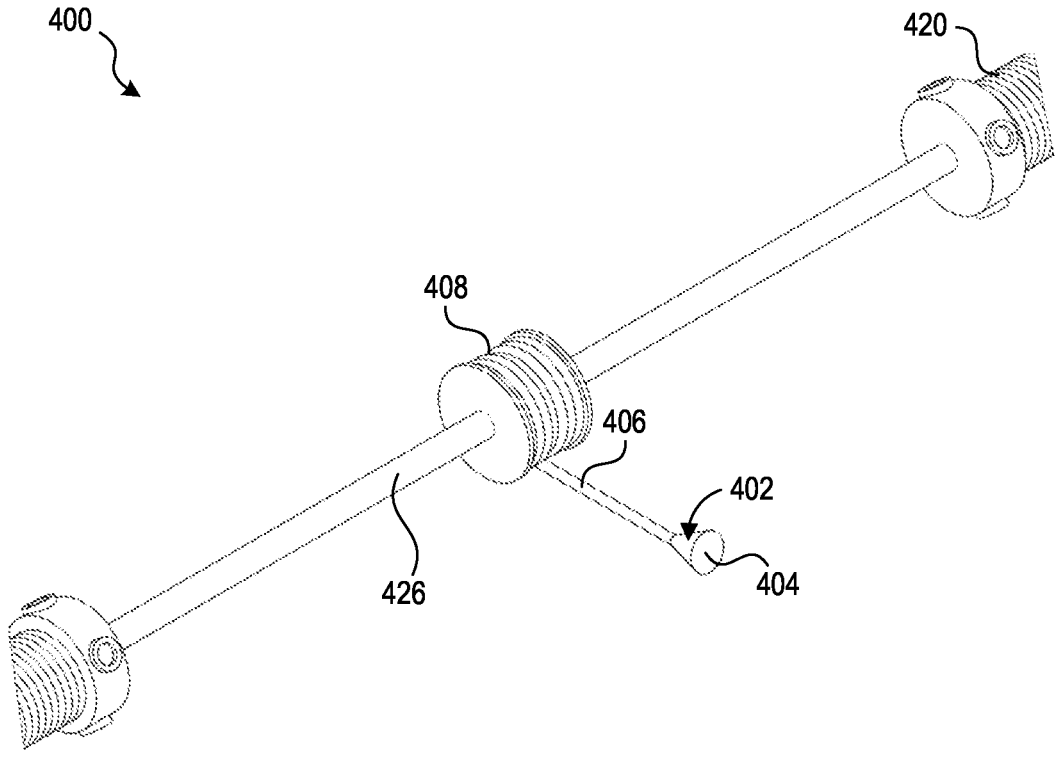

FIGS. 8A and 8B are isometric views an automated trailer door system 400 ("system 400") configured in accordance with embodiments of the present technology. The system 400 includes components associated with the trailer T that can interfaced with one or more door puller systems associated with the loading dock to open and/or close the trailer door TD. For example, in the illustrated embodiment, the trailer T includes a puller interface portion 402 having an interface feature 404 on an exterior portion of the trailer T, above the trailer door TD. The interface feature 404 can be a puller device or feature (e.g., a handle, a plug, a knob, a coupling, etc.) configured for engagement by a component of the loading dock (e.g., a corresponding hook, fork, clamp, finger, bracket, tine, etc.) operably coupled to a retraction mechanism configured to pull the puller device away from the trailer T to open the trailer door TD. The interface feature 404 can be aligned with the centerline of the trailer T or laterally offset to either side. In these embodiments, the trailer door TD can be biased by a counterbalance 420 toward the closed position such that removing the pulling force on the interface feature 404 permits closing the trailer door TD without needing to push a component of the system 400. Reduced bias of the counterbalance 420 also may discourage unauthorized users from manually opening the trailer door TD. The puller interface portion 402 can be operably coupled to a cable 406 wrapped around a drum 408 and associated with the counterbalance 420 to couple the puller interface portion 402 to the trailer door TD such that pulling on the puller interface portion 402 rotates the counterbalance shaft 426 and opens the trailer door TD. The loading dock can include a control system to manipulate the interface portion 402 based on a sensed position of the trailer door TD.

Figure 9:
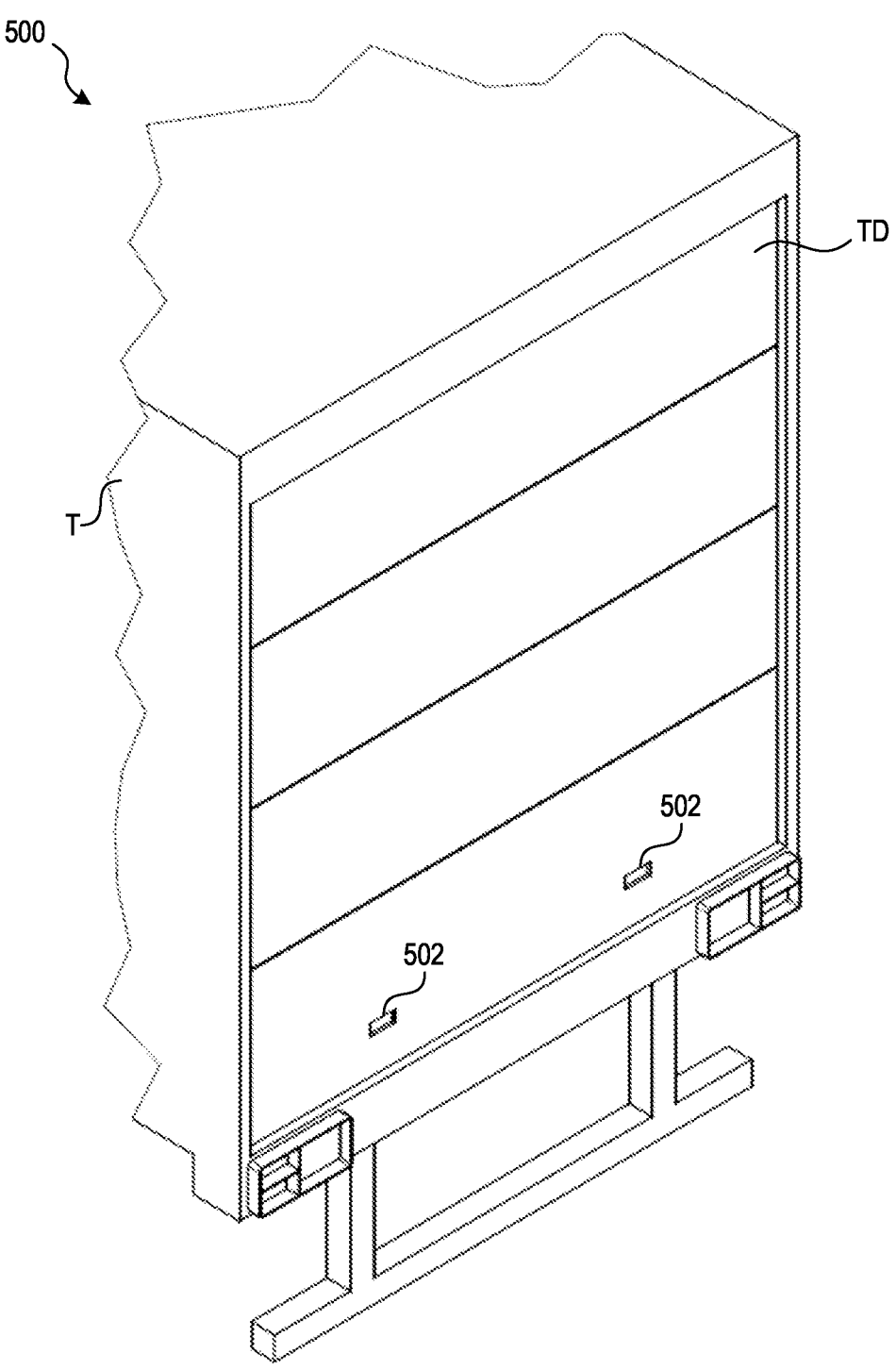
FIG. 9 is an isometric view illustrating various components and features of an automated trailer door system configured in accordance with embodiments of the present technology.
Figure 10:
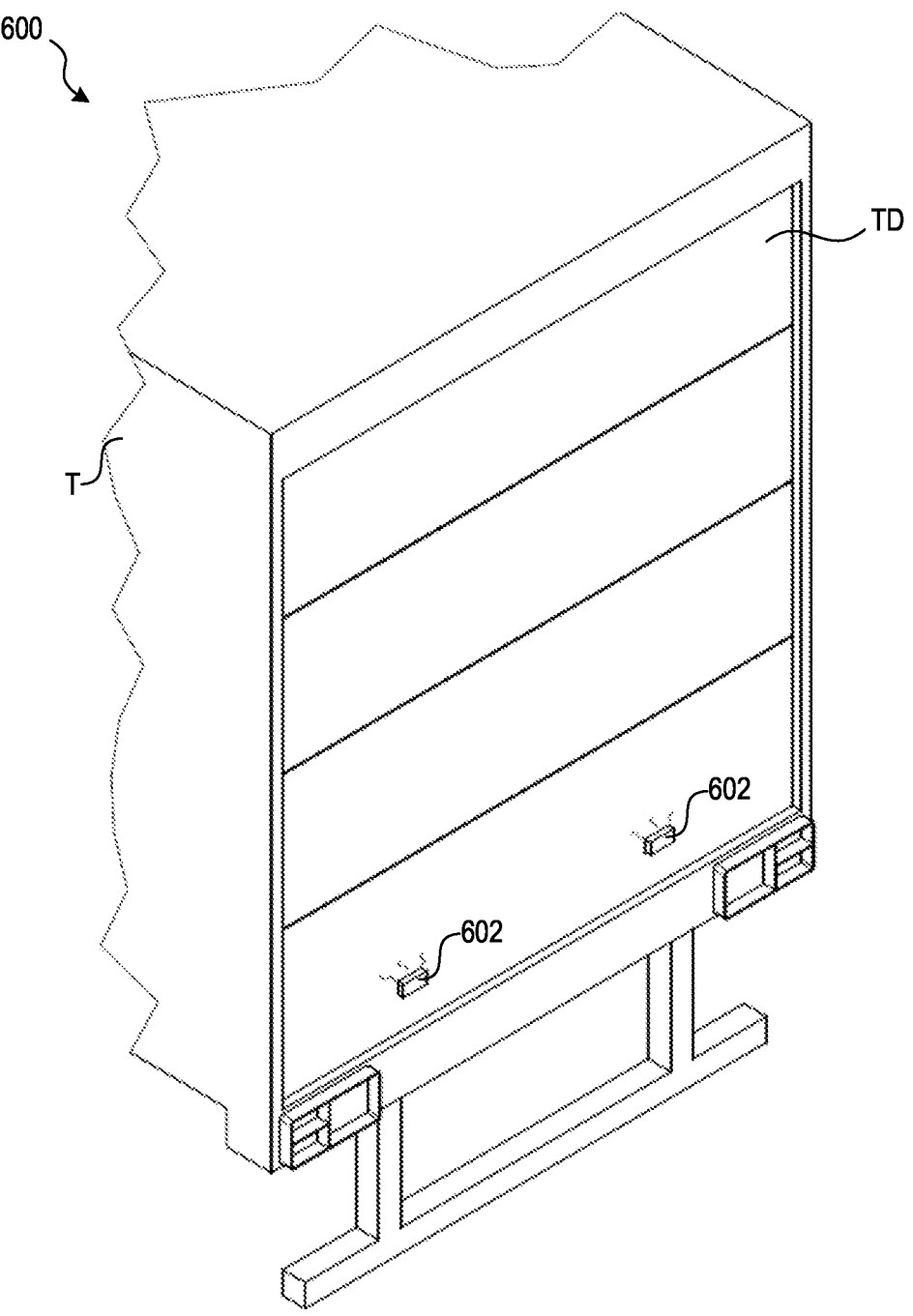
FIG. 10 is an isometric view illustrating various components and features of an automated trailer door system configured in accordance with other embodiments of the present technology.

FIG. 9 is an isometric view of an automated trailer door system 500 ("system 500") having one or more fork pockets 502 (e.g. two fork pockets 502), and FIG. 10 is an isometric view of an automated trailer door system 600 ("system 600") having one or more magnetic contact pads 602 (e.g., two magnetic pads 602) configured in accordance with embodiments of the present disclosure for use with a loading dock. The system 500 includes two fork pockets 502 in the trailer door TD for receiving the distal end portions forklift tines (not shown) therein to open and/or close the trailer door TD by upward or downward movement, respectively, of the tines. The fork pockets 502 may include a flexible or hinged cover (not shown) that prevents dirt, debris, moisture, etc. from entering the trailer T through the fork pockets 502, while allowing the distal end of the forklift tines to fully engage with the fork pockets 502 to open and/or close the trailer door TD. The system 600 includes two magnetic contact pads 602 (e.g., ferrous pads) on the trailer door TD for magnetically engaging with magnetic features (e.g., magnets) on a forklift or other vehicle/system to open and/or close the trailer door TD by raising or lowering, respectively, the magnetic features. In other embodiments, the magnet features can be positioned on the trailer door and the magnetic contact pads can be positioned on the forklift. Accordingly, in some embodiments an automated guided vehicle (AGV; e.g., an autonomous forklift) can be used to raise and lower the door by engaging the fork pockets 502 and/or the magnetic pads 602 of the trailer door TD as described above. In other embodiments, tines or similar features for engaging the fork pockets 502 and/or magnetic features for engaging the magnetic contact pads 602 can be operably mounted to a suitable upward/downward drive system positioned at or near the loading dock face to open and close the trailer door as described above.

Figure 11:
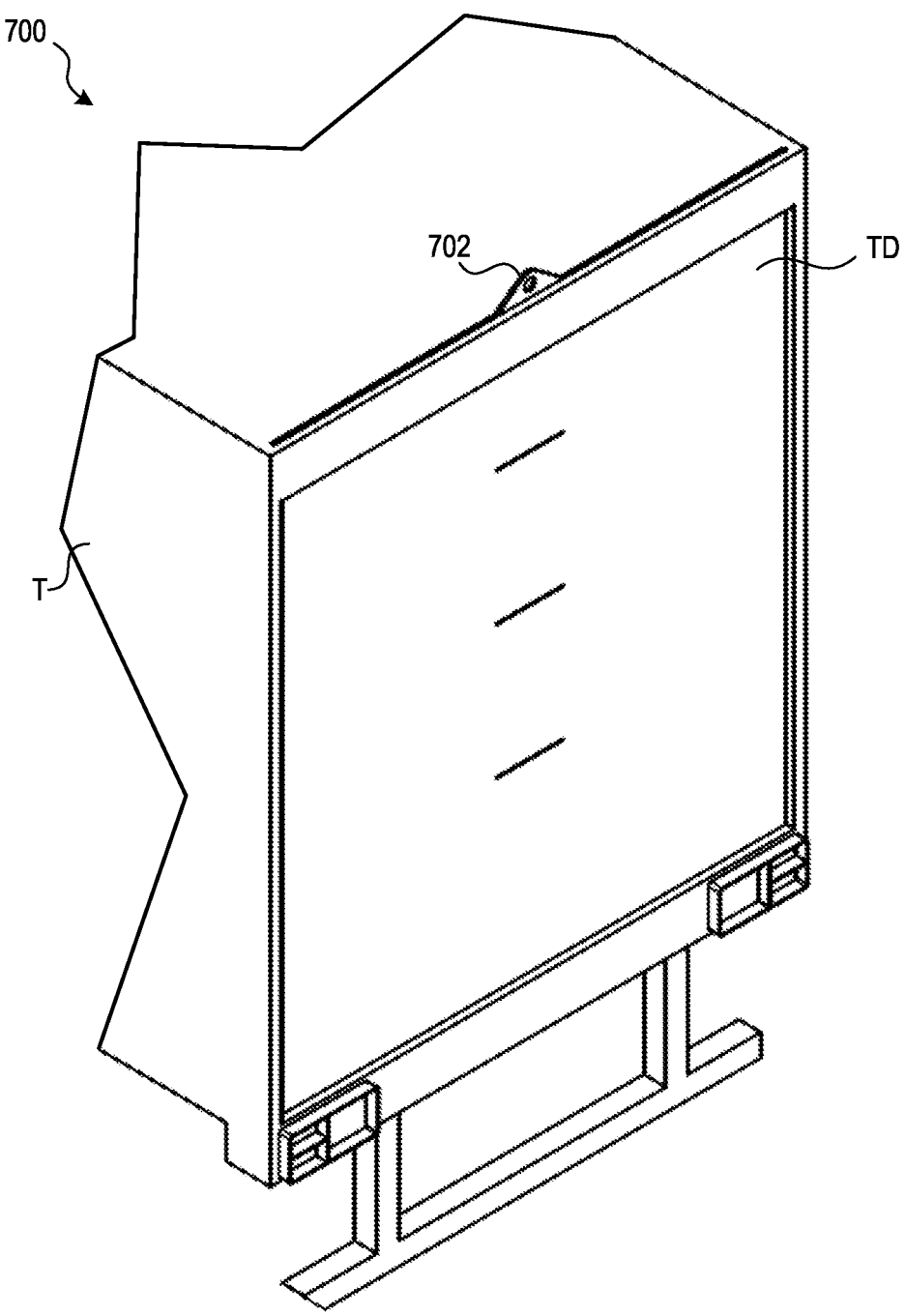
FIG. 11 is an isometric view illustrating various components and features of an automated trailer door system configured in accordance with further embodiments of the present technology.
Figure 12:
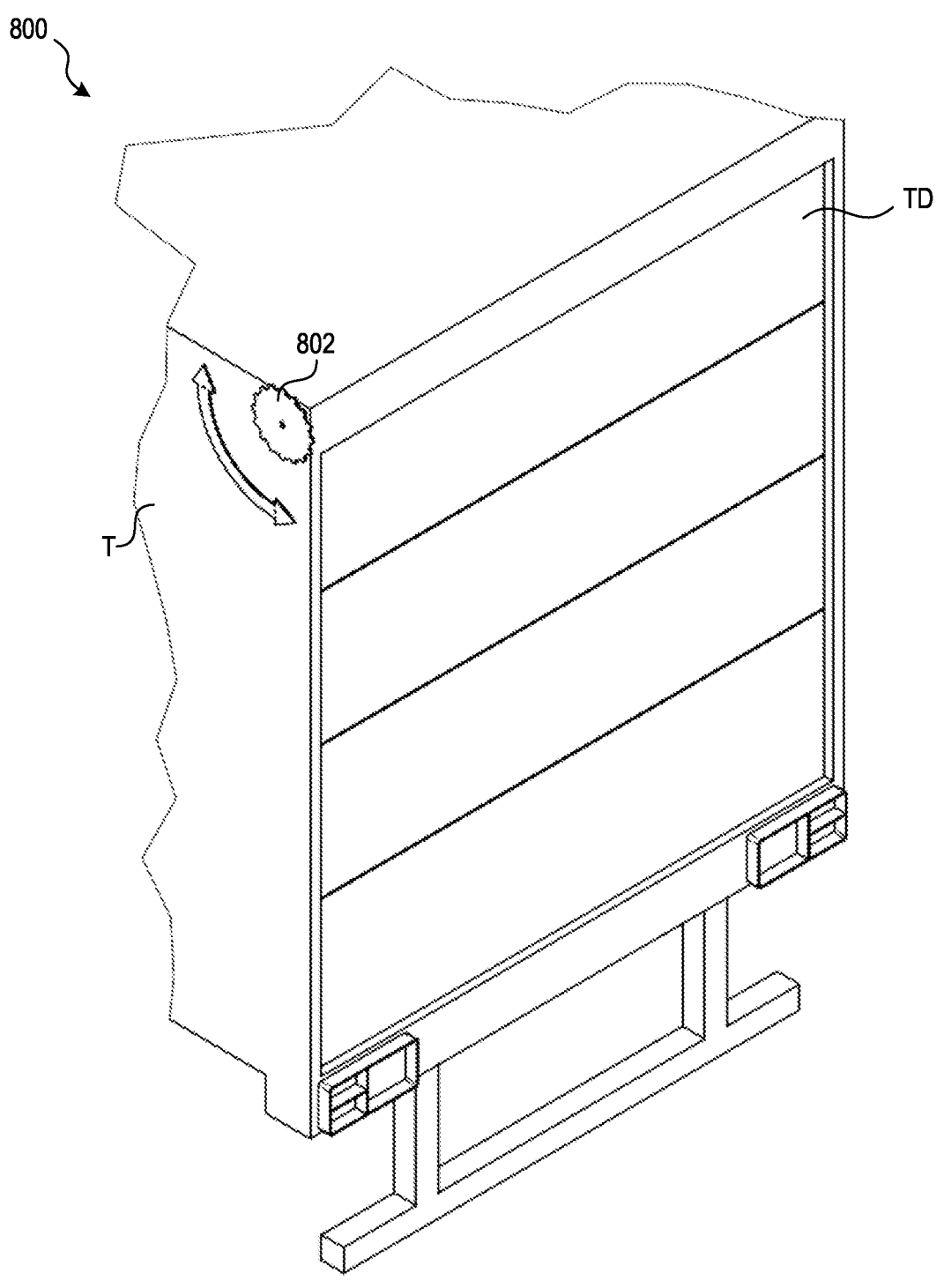
FIG. 12 is an isometric view illustrating various components and features of an automated trailer door system configured in accordance with embodiments of the present technology.

FIG. 11 is an isometric view of an automated trailer door system 700 ("system 700") having a monolithic door 702, and FIG. 12 is an isometric view of an automated trailer door system 800 ("system 800") having an external drive gear 802, configured in accordance with embodiments of the present disclosure for use with a loading dock. In the system 700, the monolithic door 702 includes a tab extending through the trailer T roof R or sides S (and having, e.g., and engagement aperture) that can be operably engaged by a component of the loading dock (e.g., a motorized or otherwise driven hook, arm, actuator, clamp, etc.) and moved to open and close the trailer door TD. The system 800 includes an external gear 802 rotatably coupled to the counterbalance of the trailer door TD can configured to operably engage a corresponding drive system of the loading dock (e.g., a driven gear) to open and/or close the trailer door TD.

Figure 13:
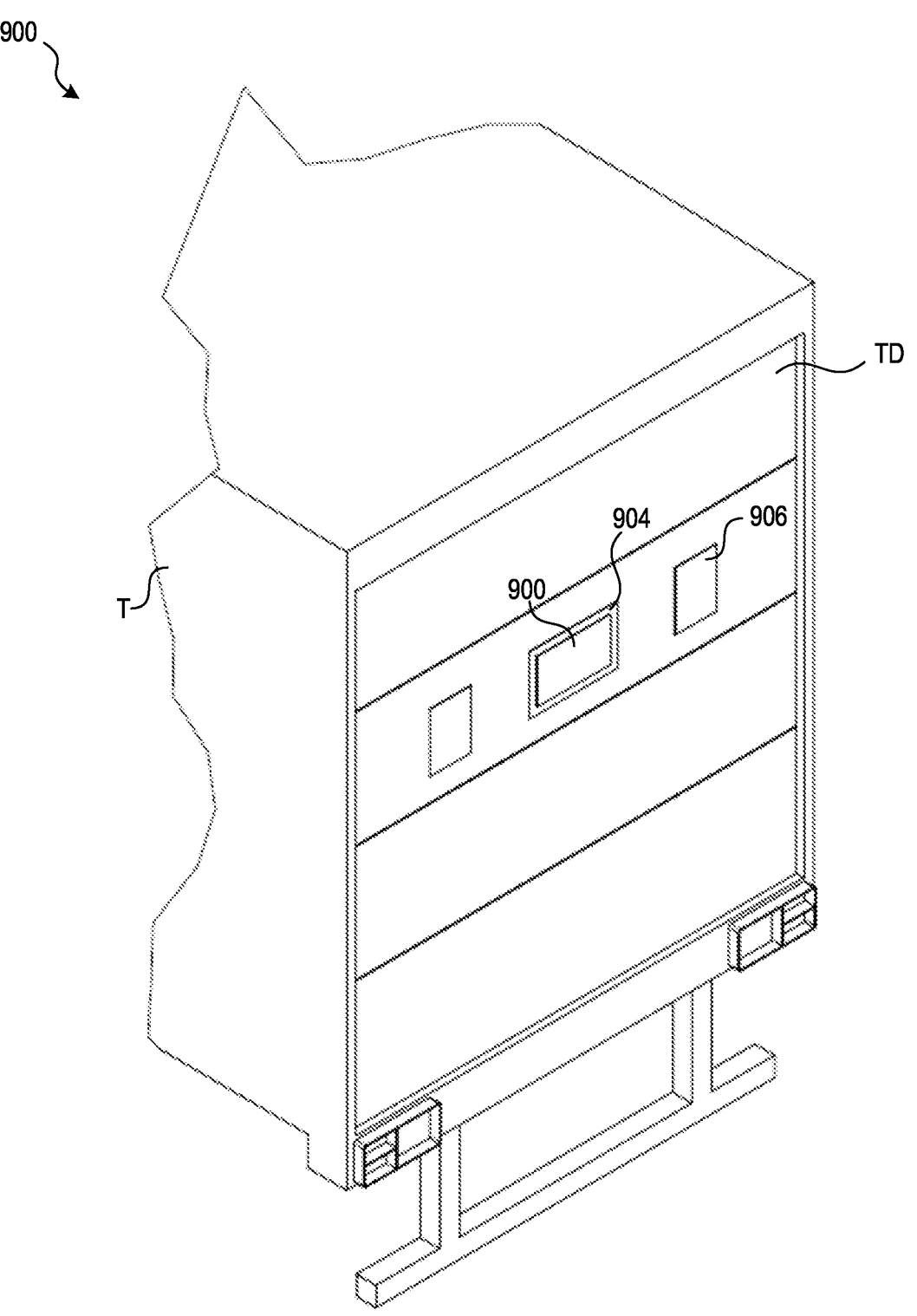
FIG. 13 is an isometric view illustrating various components and features of a vehicle identification system configured in accordance with embodiments of the present technology.

FIG. 13 shows an embodiment of a vehicle identification system 900 suitable for use with any of the systems 100 through 800 described above. The vehicle identification system 900 can include an information display screen 902 positioned on the trailer door TD. In other embodiments, the information screen can be placed on the sides, roof, or any other suitable (externally visible) surface of the trailer T. The screen can be contained within an enclosure 904 and can include short range communication (e.g., BLUETOOTH® or near field communications (NFC), etc.) to enable the loading facility (e.g., a loading dock at a facility that loads goods on the trailer T) to transmit and display information (e.g., QR codes, payload, etc.) on the information screen 902 and for the unloading facility (e.g., a loading dock at a facility that unloads goods off the trailer T) to clear information or change information on the information screen 902 for reloading with new information. At the unloading facility, a camera, scanner, reader and/or other optical, infrared, etc. device can scan a unique code, e.g., a QR code, on the information screen 902 and determine whether the load is valid for that particular loading dock. The screen can include a Liquid crystal display (LCD) screen, Light-emitting diode (LED) screen, backlit LCD screen, Thin-film transistor (TFT) LCD screen, Quantum dot (QLED) display screen, etc. Some embodiments of the information screen 902 can use, e.g., an E Ink model VB3300-series reflective electrophoretic display available through E Ink Holdings Inc., at https://www.eink.com/. Such screens use power only when transitioning the display of the screen. The system 900 can include batteries or capacitors for powering the system 900. One or more solar panels 906 or regenerative energy devices can be used to charge the system 900, or the system 900 can be connected to the power system of the trailer T. In some embodiments, if the trailer T is in transit or empty, the information screen 902 can display advertising information, hazard signals, turn signals, or other information.

Figure 15:
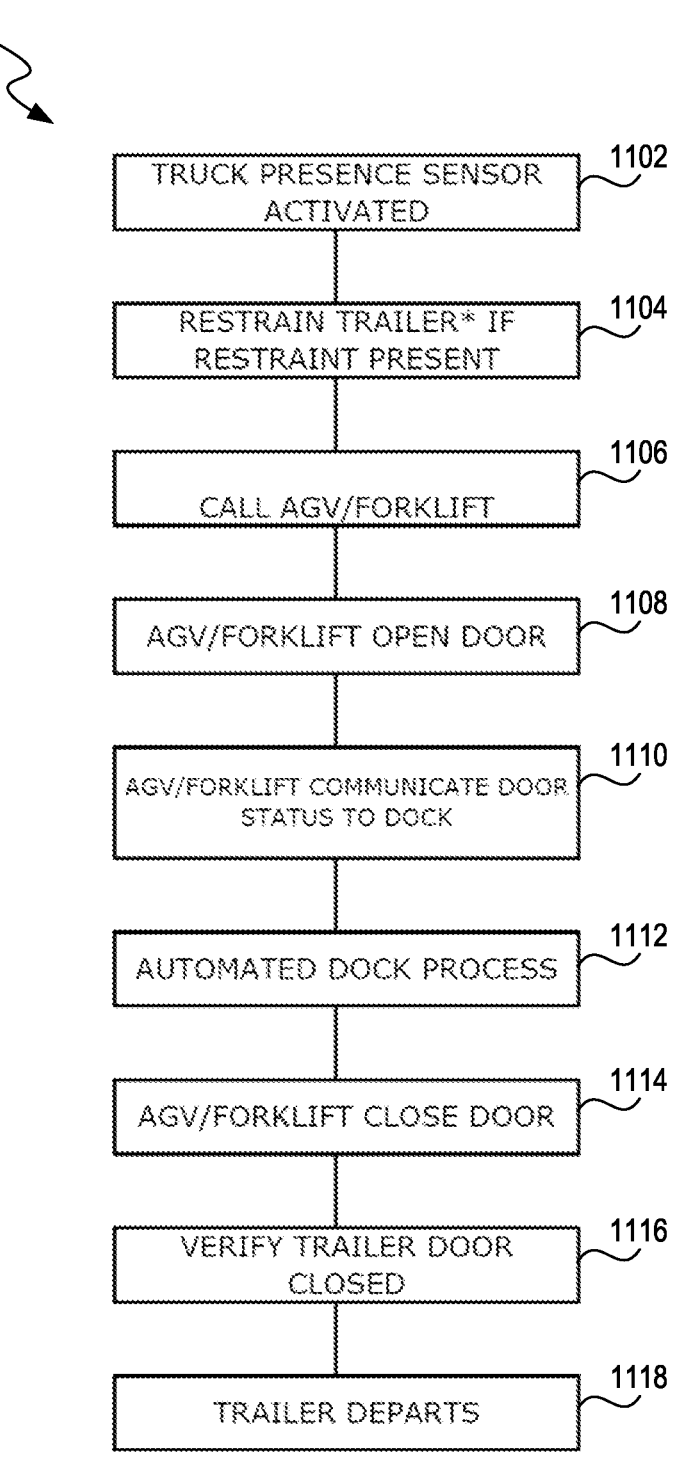
Figure 16:
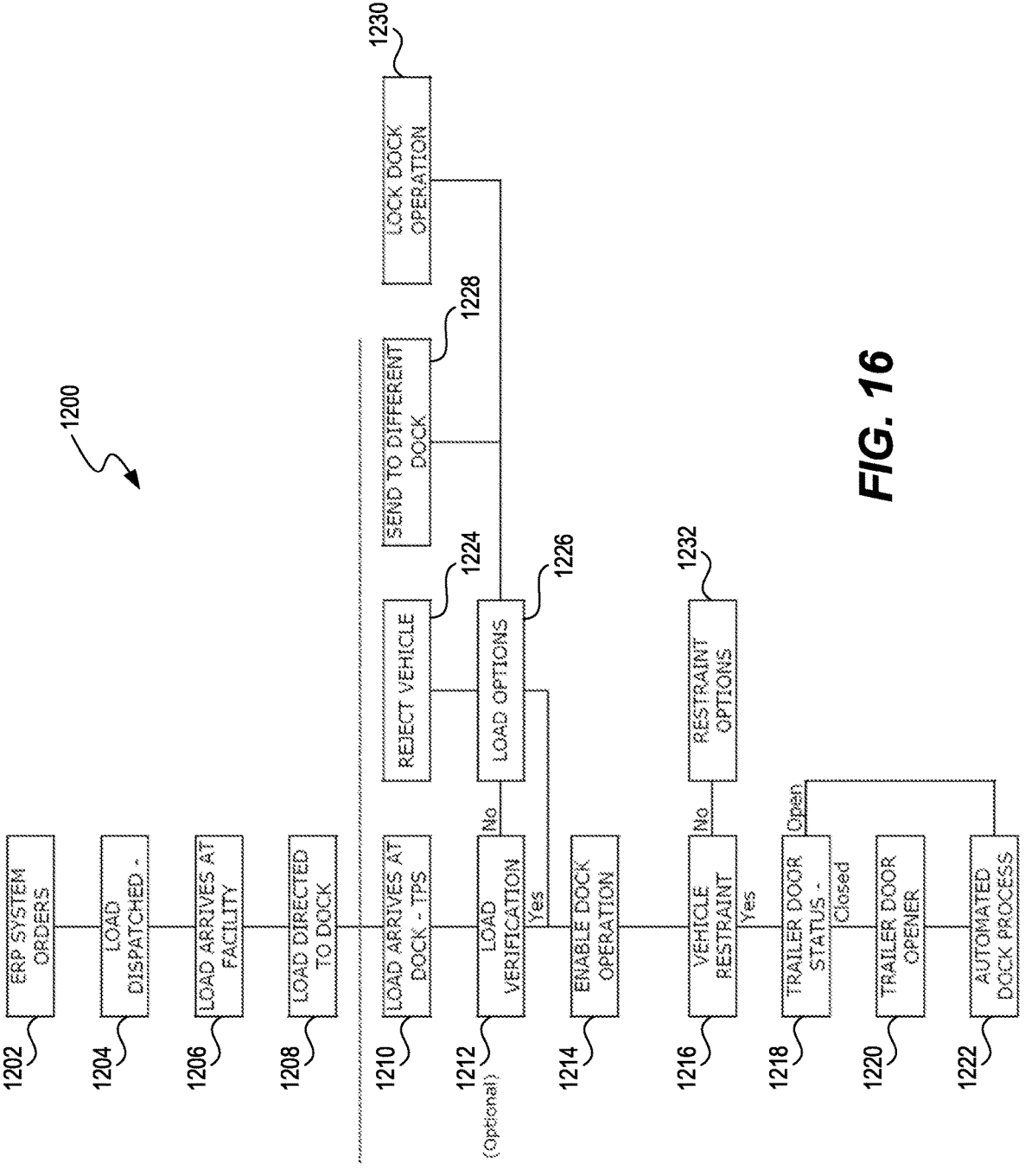

FIGS. 14-16 show representative loading dock operational flowcharts for use with the systems 100-900 described above. FIG. 14 shows a loading dock operation flowchart 1000 including operations of the systems 100 and 200 described herein. The flowchart begins in block 1002 when the trailer door opener system is activated (e.g., subsystems 110 or 210). Once the trailer door opener system is activated, in block 1004, the trailer door opening system is lowered to contact the trailer. Next, in block 1006, the arms of the subsystem (e.g., arms 152) are retracted to orient the subsystem in block 1008, thereby engaging the trailer with the door opener in block 1010 (e.g., the door winder unit 140, the roller 212, etc.). Next, in block 1012, the door opener is activated to open the door, and in block 1014, the subsystem can be optionally disengaged from the trailer for processing/unloading in block 1016 (or alternatively can stay operably coupled during processing/unloading). Next, in block 1018, the door opener system moves into engagement with the trailer and activates in block 1020 to close the door with the door opener system. Next, in block 1022, the door opener system disengages the door opener from the trailer, and in block 1024, the subsystem disengages from the trailer. Next, in block 1026, the subsystem moves to a stored position.

FIG. 15 shows a loading dock operation flowchart 1100 including operations of the systems 100-900 described herein. The flowchart 1100 begins in block 1102 when a truck presence sensor senses the presence of a truck at a loading dock. The truck presence sensor can be positioned on a loading dock door, a wall of the loading dock, or any other suitable surface. The presence of a trailer detected by the truck presence sensor can initiate trailer restraint in block 1104, wherein trailer restraint is applied to the trailer if the restraint is present. The trailer restraint can be any suitable restraint for preventing movement of the trailer during loading/unloading. Next, in block 1106, the loading dock control system, e.g., as described above, sends a signal to AGV, and then in block 1108, sends a signal to the AGV to open the trailer door using any of the systems 100-900. In trailers having, e.g., the systems 500 and 600, the AGV may engage with the trailer door directly. The signal can be wireless, or can be a wired signal through contacts on the trailer. Next, and block 1110, the AGV verifies that the trailer door is open, e.g., by visual confirmation, a signal from the controller on the trailer, etc. and communicates the door status to the loading dock control system. Once the loading dock control system verifies that the trailer door is open, in block 1112, an automated dock process may be initiated (e.g., turning on one or more lights, deploying a door seal, leveling the dock, etc.). After the automated dock process concludes, in block 1114, the AGV can receive a signal to close the trailer door. Next, in block 1116, the loading dock control system verifies that the trailer door is closed, e.g., by visual confirmation, a signal from the controller on the trailer, an AGV, etc. Next, in block 118, the trailer restraint may be released such that the trailer can depart.

FIG. 16 shows a loading dock operation flowchart 1200 including operations of the systems 100-900 described herein, where an identification system can be used with the flowchart 1200. The flowchart 1200 begins in block 1202 where an ERP system orders items delivered by a trailer. Next, in block 1204, the load is dispatched and in block 1206, the load arrives at the facility. In block 1208, the load is directed to a loading dock and in block 1210 the load arrives at the loading dock. Next, in optional block 1212, the load is verified, e.g., by any suitable load verification signal, including the identification system incorporated by reference herein. If the load is unverified, in block 1226, the loading dock control system selects load options, including rejecting the vehicle at block 1224, sending the vehicle to a different dock at block 1228, and locking operation of the loading dock at block 1230. Alternatively, if the load is verified, in block 1214, the loading dock operation is enabled. Next, in block 1216, a vehicle restraint can be applied to the trailer to prevent movement of the trailer during loading/unloading. If the vehicle restraint is not present, in block 1232, restraint options can be available to the loading dock control system, e.g., wheel chocks, manual restraint, etc. Once the restraint is verified, the loading dock control system queries the trailer door status in block 1218, e.g., whether the trailer door is open or closed, by visual confirmation, a signal from the controller on the trailer, an AGV, etc. If the trailer door is closed, the loading dock control system in block 1220 opens or sends a signal to open (e.g., to an AGV) the trailer door using any of systems 100-900 described herein. If the trailer door is open at the query in status of block 1218, or after opening in block 1220, the automated dock process is initiated in block 1222. Although not shown, the flowchart 1200 may further include sending a signal to close the trailer door and releasing the trailer restraint so that the trailer can depart from the loading dock.

In addition to the embodiments described above, other examples of loading dock equipment, trailer door systems, trailer validation and/or identification systems, and other related equipment and/or systems are described in: U.S. Provisional App. No. 63/218,110, filed Jul. 2, 2021, and titled POWERED TRAILER DOOR SYSTEMS; U.S. Provisional App. No. 63/247,725, filed Sep. 23, 2021, and titled POWERED TRAILER SYSTEMS; and U.S. Provisional App. No. 63/284,501, filed Nov. 30, 2021, and titled TRAILER VALIDATION SYSTEMS; each of which is incorporated herein in its entirety by reference.

SELECTED EXAMPLES

1. An automated door operating system for use with a trailer door, the system comprising:
    a counterbalance shaft configured to be operably coupled to the trailer door, wherein a rotation of the counterbalance shaft moves the trailer door between a closed position and an open position; and
    a drive unit having—
        a torsion member operably coupled to the counterbalance shaft; and
        a drive member rotatably engaged with the torsion member, the drive member having an engagement portion accessible external to the trailer door,
        wherein rotation of the drive member via the engagement portion rotates the torsion member to move the trailer door between the closed and open positions.

2. The automated door operating system of example 1, wherein the torsion member is a worm gear, and wherein the drive member includes a worm screw portion operably engaged with the worm gear.

3. The automated door operating system of example 1, wherein the engagement portion is inset from an external surface of the trailer and aligned with an aperture in the external surface of the trailer such that the engagement portion is accessible external to the trailer.

4. The automated door operating system of example 1, wherein a portion the drive member extends through an aperture in a surface of the trailer such that the engagement portion is at least partially positioned outward from an external surface of the trailer.

5. The automated door operating system of example 4, wherein the aperture extends through a header of the trailer.

6. The automated door operating system of example 1, wherein the engagement portion includes a socket having a hexagonal shape, a square shape, a star shape, or a multi-point shape configured receive a coupling of an external drive system mounted to a structure separate from the trailer door.

7. The automated door operating system of example 1, wherein the engagement portion has a hexagonal shape, a square shape, a star shape, or a multipoint shape configured to receive a coupling of an external drive system mounted to a loading dock, a forklift, or an autonomous guided vehicle.

8. The automated door operating system of example 1, wherein the drive member is a gear positioned at an axial end of the counterbalance shaft external to an outer surface of the trailer.

9. A system for engaging a trailer to move a trailer door between a closed position and an open position, the system comprising:
    a centering body;
    a first centering arm movable relative to the centering body along a lateral axis, the first centering arm having a first alignment member positioned at a first distal end portion thereof;
    a second centering arm movable relative to the centering body along the lateral axis, the second centering arm having a second alignment member positioned at a second distal end portion thereof;
    a centering device operably coupled to the first and second centering arms and configured to move the first and second centering arms in opposite directions along the lateral axis; and
    a door winder movably coupled to the centering body, wherein the door winder includes a winding motor coupled to an engagement portion configured to releasably engage an interface member of the trailer wherein rotation of the engagement portion by operation of the winding motor moves the trailer door between the closed position and the open position.

10. The system of example 9, wherein the door winder is movably coupled to the centering body by a shuttle translatable along a shaft configured to move the door winder to an engaged position with the engagement portion contacting the interface member of the trailer.

11. The system of example 10, wherein the shaft is rotatably coupled to a shuttle motor for translating the shuttle.

12. The system of example 9, wherein the first and second alignment members have flat contact portions perpendicular to the lateral axis and configured to rotate the system into an alignment where the lateral axis is perpendicular to corresponding side surfaces of the trailer when the flat contact portions are in contact with respective side surfaces of the trailer.

13. The system of example 9, wherein the first and second centering arms are received at least partially within the centering body.

14. The system of example 13, wherein:

the first and second centering arms are movable in opposite directions via a drive system having a rack and a pinion, rotation of the pinion in a first direction causes the first and second distal end portions to translate along the lateral axis toward the centering body, and rotation of the pinion in a second direction causes the first and second distal end portions to translate along the lateral axis away the centering body.

15. The system of example 14, wherein each of the first and second centering arms includes a rack portion that operably engages the pinion.

16. The system of example 9, wherein the centering body further comprises a friction reducing component positioned between the centering body and the trailer when the door winder is engaged with the trailer.

17. The system of example 9, wherein the interface member of the trailer is rotatably engaged with a shaft torsion member coupled to a counterbalance shaft operably coupled to a trailer door and configured to rotate to move the trailer door between an open position and a closed position, and wherein rotation of the interface member rotates the shaft torsion member to move the trailer door between the open and closed positions.

18. The system of example 9, wherein the system is configured for use at a loading dock.

19. The system of example 9, wherein the system is configured for use with a forklift or an autonomous guided vehicle.

20. An automated door operating system for use with a trailer door at a loading dock, the system comprising:

a pusher interface member having an engagement portion and being operably coupled to the trailer door, the pusher interface member being aligned with an aperture in an external surface of the trailer such that the pusher interface member is accessible external to the trailer; and a door pusher rod operably mounted to the loading dock and having a distal end portion configured to operably engage with the engagement portion of the pusher interface member through the aperture, wherein, when the distal end portion of the pusher rod is operably engaged with the pusher interface member, axial translation of the door pusher rod toward the trailer moves the trailer door from a closed position toward an open position.

21. The automated door operating system of example 20, wherein the engagement portion of the pusher interface member is tapered and configured to align the interface portion of the door pusher rod with the aperture.

22. The automated door operating system of example 20, further comprising a counterbalance operably coupled to a trailer door and configured to bias the trailer door toward the closed position such that removal of the door pusher rod from the pusher interface member moves the trailer door toward the closed position.

23. The automated door operating system of example 20, wherein the aperture extends through a header of the trailer.

24. An automated trailer door operating system, the system comprising:

a puller interface member having an engagement portion and being operably coupled to the trailer door, the puller interface member extending through an aperture in an external surface of the trailer such that the engagement portion is accessible external to the trailer; and a door puller operably mounted to the loading dock and having a coupling configured to releasably engage the engagement portion of the puller interface member, wherein, when the door puller coupling is engaged with the engagement portion of the puller interface member, translation of the door puller coupling away from the trailer moves the trailer door from a closed position toward an open position.

25. The automated door operating system of example 24, wherein the engagement portion of the puller interface member is a plug, a knob, or a coupling, and wherein the engagement portion is configured to be couplable to the interface portion of the door puller.

26. The automated door operating system of example 24, further comprising a counterbalance operably coupled to a trailer door and configured to bias the trailer door toward the closed position such that translation of the door puller toward the trailer moves the trailer door toward the closed position.

27. The automated door operating system of example 24, wherein the aperture extends through a header of the trailer.

28. A system for moving a trailer door between a closed position and an open position, the system comprising:

a support structure configured to be mounted to a loading dock;

a roller movably coupled to the support structure, the roller having an annular engagement portion configured to contact a surface of the trailer door, whereby rotation of the roller moves the trailer door between a closed position and an open position; and a drive system coupled to the roller.

29. The system of example 28, wherein the surface of the trailer door includes a contact patch, and wherein rotation of the door roller while engaged with the contact patch moves the trailer door between the closed and open positions.

30. The system of example 29, wherein the engagement portion comprises teeth configured to engage with corresponding teeth of a surface of the contact patch.

31. The system of example 29, wherein the contact patch extends below a bottom of the trailer door such that the door roller is configured to engage with the contact patch when the trailer door is in the open position.

32. The system of example 29, wherein the door roller is translatable at each end of the door roller with respect to the centering body such that a longitudinal axis of the door roller is configured to skew with respect to the lateral axis such that the door roller interfaces with the contact patch.

33. The system of example 32, wherein the door roller is biased against the contact patch of the trailer door.

34. The system of example 28, wherein the support system includes:

a centering body, wherein the roller is movably coupled to the centering body;

a first centering arm movable with respect the centering body along a lateral axis, the first centering arm having a first alignment member positioned at a first distal end portion away from the centering body;

a second centering arm movable along the lateral axis, the second centering arm having a second alignment member positioned at a second distal end portion away from the centering body; and a centering device operably coupled to the first and second centering arms and configured to move the first and second centering arms in opposite directions.

35. The system of example 34, wherein the first and second alignment members have flat contact portions perpendicular to the lateral axis and configured to rotate the door roller system into an alignment where the lateral axis is perpendicular to corresponding side surfaces of the trailer when the flat contact portions are in contact with the respective side surfaces.

36. The system of example 34, wherein the first and second centering arms are received at least partially within the centering body.

37. The system of example 36, wherein:

the first and second centering arms are movable in opposite directions by a drive system having a rack and a pinion, rotation of the pinion in a first direction causes the first and second distal end portions to translate along the lateral axis toward the centering body, and rotation of the pinion in a second direction causes the first and second distal end portions to translate along the lateral axis away the centering body.

38. The system of example 37, wherein each of the first and second centering arms includes a rack portion that operably engages the pinion.

39. The system of example 34, wherein the centering body further comprises a friction reducing component positioned between the centering body and the trailer when the door roller system is engaged with the trailer.

40. A method for operating a trailer door, the method comprising:

contacting an engagement portion of a drive member with an external drive system mounted to a loading dock, a forklift, or an autonomous guided vehicle, wherein the drive member is— positioned on a trailer and accessible external to the trailer, and rotatably engaged with a torsion member that is operably coupled to a counterbalance shaft, wherein the counterbalance shaft is configured to be operably coupled to the trailer door, and wherein a rotation of the counterbalance shaft moves the trailer door between a closed position and an open position; and rotating the drive member via the engagement portion to rotate the torsion member and move the trailer door between the closed and open positions.

41. The method of example 40, wherein the torsion member is a worm gear, and wherein the drive member further includes a worm screw portion operably engaged with the worm gear.

42. The method of example 40, wherein prior to contacting the engagement portion of the drive member with the external drive system, the method further comprises:

positioning a system for engaging a trailer above a trailer roof, the system including— a centering body, a first centering arm movable relative to the centering body along a lateral axis, the first centering arm having a first alignment member positioned at a first distal end portion thereof, and a second centering arm movable relative to the centering body along the lateral axis, the second centering arm having a second alignment member positioned at a second distal end portion thereof; and moving, via a drive system having a rack and a pinion, the first and second centering arms in opposite directions along the lateral axis, wherein a rotation of the pinion in a first direction causes the first and second distal end portions to translate along the lateral axis toward the centering body, and wherein a rotation of the pinion in a second direction causes the first and second distal end portions to translate along the lateral axis away the centering body.

43. The method of example 42, wherein the first and second alignment members have flat contact portions perpendicular to the lateral axis and configured to rotate the system into an alignment where the lateral axis is perpendicular to corresponding side surfaces of the trailer when the flat contact portions are in contact with respective side surfaces of the trailer.

44. The method of example 42, further comprising translating, via a shuttle translatable along a shaft, the external drive system between a disengaged position, wherein the external drive system is spaced away from the engagement portion of the drive member, and an engaged position, wherein the external drive system contacts the engagement portion of the drive member 45. The method of example 44, wherein the shaft is rotatably coupled to a shuttle motor for translating the shuttle.

46. The method of example 40, wherein the external drive system further comprises a door winder movably coupled to the external drive system, and wherein the door winder includes a winding motor configured to rotate the drive member.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, for fluid (e.g., air) transfer, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any of the items in the list, all of the items in the list, and any combination of the items in the list.

The above Detailed Description of examples and embodiments of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements. Further any specific numbers noted herein are only examples: alternative implementations may employ differing values or ranges.

While the above description describes various embodiments of the invention and the best mode contemplated, regardless how detailed the above text, the invention can be practiced in many ways. Details of the system may vary considerably in its specific implementation, while still being encompassed by the present disclosure. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims. From the foregoing, it will be appreciated that specific embodiments of the invention have been described herein for purposes of illustration, but that various modifications may be made without deviating from the spirit and scope of the various embodiments of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A system for engaging a trailer to move a trailer door between a closed position and an open position, the system comprising:

a centering body;

a first centering arm movable laterally toward and away from the centering body along a lateral axis, the first centering arm having a first alignment member positioned at a first distal end portion thereof;

a second centering arm movable laterally toward and away from the centering body along the lateral axis, the second centering arm having a second alignment member positioned at a second distal end portion thereof;

a centering device operably coupled to the first and second centering arms and configured to move the first and second centering arms in opposite directions along the lateral axis; and a door winder movably coupled to the centering body, wherein the door winder includes a winding motor coupled to an engagement portion configured to releasably engage an interface member of the trailer wherein rotation of the engagement portion by operation of the winding motor moves the trailer door between the closed position and the open position.

2. The system of claim 1, further comprising an automated door operating system for use with the trailer door, the automated door operating system comprising:

a counterbalance shaft configured to be operably coupled to the trailer door, wherein a rotation of the counterbalance shaft moves the trailer door between the closed position and the open position; and a drive unit having— a torsion member operably coupled to the counterbalance shaft; and a drive member rotatably engaged with the torsion member, the drive member having the interface member accessible external to the trailer door by the door winder, wherein the door winder is configured to rotate the drive member when the engagement portion engages the interface member to rotates the torsion member to move the trailer door between the closed position and the open positions.

3. The system of claim 2, wherein the torsion member is a worm gear, and wherein the drive member includes a worm screw portion operably engaged with the worm gear.

4. The system of claim 2, wherein the interface member is inset from an external surface of the trailer and aligned with an aperture in the external surface of the trailer such that the engagement portion is accessible from external to the trailer.

5. The system of claim 2, wherein a portion the drive member extends through an aperture in a surface of the trailer such that the interface member is at least partially positioned outward from an external surface of the trailer.

6. The system of claim 5, wherein the aperture extends through a header of the trailer.

7. The system of claim 2, wherein the interface member includes a socket having a hexagonal shape, a square shape, a star shape, or a multipoint shape configured to receive the engagement portion, wherein the engagement portion is mounted to a structure separate from the trailer door.

8. The system of claim 2, wherein the drive member is a gear positioned at an axial end of the counterbalance shaft external to an outer surface of the trailer.

9. The system of claim 1, wherein the door winder is movably coupled to the centering body by a shuttle translatable along a shaft configured to move the door winder to an engaged position with the engagement portion contacting the interface member of the trailer.

10. The system of claim 9, wherein the shaft is rotatably coupled to a shuttle motor for translating the shuttle.

11. The system of claim 1, wherein the first and second alignment members have flat contact portions perpendicular to the lateral axis and configured to rotate the system into an alignment where the lateral axis is perpendicular to corresponding side surfaces of the trailer when the flat contact portions are in contact with respective side surfaces of the trailer.

12. The system of claim 1, wherein the first and second centering arms are received at least partially within the centering body.

13. The system of claim 12, wherein:

the first and second centering arms are movable via a drive system having a rack and a pinion, rotation of the pinion in a first direction causes the first and second distal end portions to translate along the lateral axis toward the centering body, and rotation of the pinion in a second direction causes the first and second distal end portions to translate along the lateral axis away from the centering body.

14. The system of claim 13, wherein each of the first and second centering arms includes a rack portion that operably engages the pinion.

15. The system of claim 1, wherein the centering body further comprises a friction reducing component positioned between the centering body and the trailer when the door winder is engaged with the trailer.

16. The system of claim 1, wherein the interface member of the trailer is rotatably engaged with a shaft torsion member coupled to a counterbalance shaft operably coupled to a trailer door and configured to rotate to move the trailer door between an open position and a closed position, and wherein rotation of the interface member rotates the shaft torsion member to move the trailer door between the open and closed positions.

17. The system of claim 1, wherein the system is configured for use at a loading dock.

18. The system of claim 1, wherein the system is configured for use with a forklift or an autonomous guided vehicle.

19. A method for operating a trailer door, the method comprising:

contacting an engagement portion of a drive member with an external drive system mounted to a loading dock, a forklift, or an autonomous guided vehicle, wherein the drive member is— positioned on a trailer and accessible external to the trailer, and rotatably engaged with a torsion member that is operably coupled to a counterbalance shaft, wherein the counterbalance shaft is configured to be operably coupled to the trailer door, and wherein a rotation of the counterbalance shaft moves the trailer door between a closed position and an open position; and rotating the drive member via the engagement portion to rotate the torsion member and move the trailer door between the closed and open positions.

20. The method of claim 19, wherein the torsion member is a worm gear, and wherein the drive member further includes a worm screw portion operably engaged with the worm gear.

21. The method of claim 19, wherein the external drive system further comprises a door winder movably coupled to the external drive system, and wherein the door winder includes a winding motor configured to rotate the drive member.

22. A method for operating a trailer door of a trailer, the method comprising:

positioning a system for engaging a trailer above a trailer roof of the trailer, wherein the system is mounted to a loading dock, a forklift, or an autonomous guided vehicle, and wherein the system includes— a centering body, a first centering arm movable relative to the centering body along a lateral axis, the first centering arm having a first alignment member positioned at a first distal end portion thereof, a second centering arm movable relative to the centering body along the lateral axis, the second centering arm having a second alignment member positioned at a second distal end portion thereof; and a drive system having a rack and a pinion;

moving, via the drive system, the first and second centering arms in opposite directions along the lateral axis, wherein a rotation of the pinion in a first direction causes the first and second distal end portions to translate along the lateral axis toward the centering body, and wherein a rotation of the pinion in a second direction causes the first and second distal end portions to translate along the lateral axis away the centering body; and contacting an engagement portion of a drive member with the drive system, wherein the drive member is— positioned on a trailer and accessible external to the trailer, and rotatably engaged with a torsion member that is operably coupled to a counterbalance shaft, wherein the counterbalance shaft is configured to be operably coupled to the trailer door, and wherein a rotation of the counterbalance shaft moves the trailer door between a closed position and an open position.

23. The method of claim 22, wherein the first and second alignment members have flat contact portions perpendicular to the lateral axis and configured to rotate the system into an alignment where the lateral axis is perpendicular to corresponding side surfaces of the trailer when the flat contact portions are in contact with respective side surfaces of the trailer.

24. The method of claim 22, further comprising translating, via a shuttle translatable along a shaft, the external drive system between a disengaged position, wherein the external drive system is spaced away from the engagement portion of the drive member, and an engaged position, wherein the external drive system contacts the engagement portion of the drive member.

25. The method of claim 24, wherein the shaft is rotatably coupled to a shuttle motor for translating the shuttle.

\* \* \* \* \*